(12) United States Patent
Chinthakindi et al.

(10) Patent No.: US 7,265,019 B2
(45) Date of Patent: Sep. 4, 2007

(54) ELASTOMERIC CMOS BASED MICRO ELECTROMECHANICAL VARACTOR

(75) Inventors: Anil K. Chinthakindi, Fishkill, NY (US); Henri D. Schnurmann, Monsey, NY (US)

(73) Assignee: International Business Machines Corporation, Armonk, NY (US)

( * ) Notice: Subject to any disclaimer, the term of this patent is extended or adjusted under 35 U.S.C. 154(b) by 269 days.

(21) Appl. No.: 10/710,286

(22) Filed: Jun. 30, 2004

(65) Prior Publication Data

US 2006/0003482 A1    Jan. 5, 2006

(51) Int. Cl.
*H01L 21/20* (2006.01)
*H01L 21/4763* (2006.01)

(52) U.S. Cl. .................. 438/381; 438/397; 438/652

(58) Field of Classification Search .......... 438/397, 438/652, 381, 396; 361/277, 278
See application file for complete search history.

(56) References Cited

U.S. PATENT DOCUMENTS

| | | | |
|---|---|---|---|
| 6,355,534 B1* | 3/2002 | Cheng et al. .............. 438/379 |
| 6,509,620 B2* | 1/2003 | Hartwell et al. ............ 257/415 |
| 6,633,260 B2* | 10/2003 | Paschen et al. ...... 343/700 MS |
| 6,649,852 B2* | 11/2003 | Chason et al. .............. 200/181 |
| 6,661,069 B1 | 12/2003 | Chinthakindi et al. |
| 6,906,905 B1* | 6/2005 | Chinthakindi ............... 361/277 |
| 7,006,342 B2* | 2/2006 | Williams et al. ............ 361/281 |
| 7,067,869 B2* | 6/2006 | Cheng et al. ............... 257/301 |
| 2003/0222660 A1* | 12/2003 | Morimoto .................... 324/661 |

* cited by examiner

*Primary Examiner*—Shouxiang Hu
(74) *Attorney, Agent, or Firm*—Joseph P. Abate, Esq.

(57) ABSTRACT

A micro electro-mechanical system (MEMS) variable capacitor is described, wherein movable comb electrodes of opposing polarity are fabricated simultaneously on the same substrate and are independently actuated. The electrodes are formed in an interdigitated fashion to maximize capacitance. The MEMS variable capacitor includes CMOS manufacturing steps in combination with elastomeric material selectively used in areas under greatest stress to ensure that the varactor will not fail as a result of stresses that may result in the separation of dielectric material from the conductive elements. The combination of a CMOS process with the conducting elastomeric material between vias increases the overall sidewall area, which provides increased capacitance density.

15 Claims, 23 Drawing Sheets

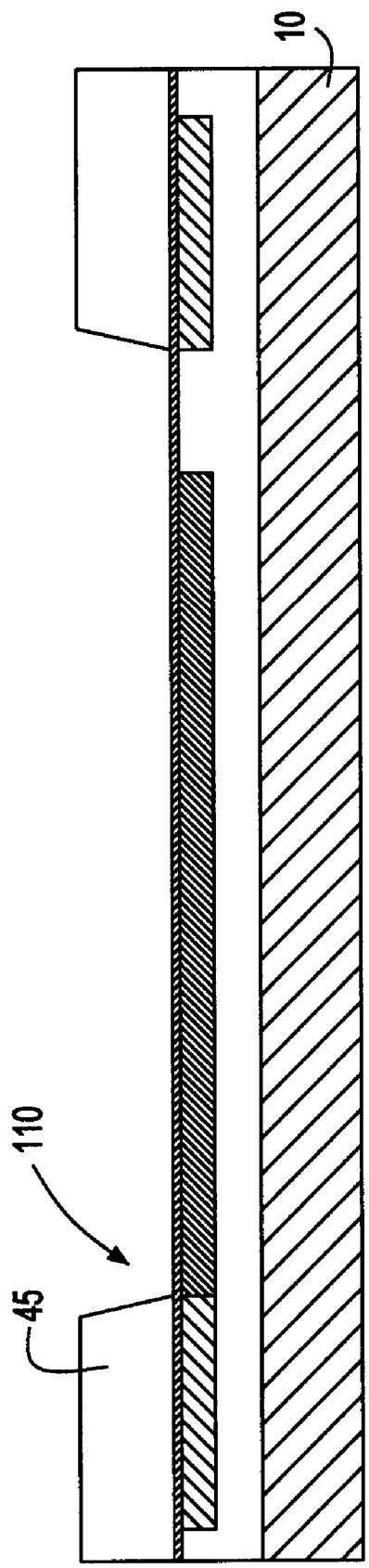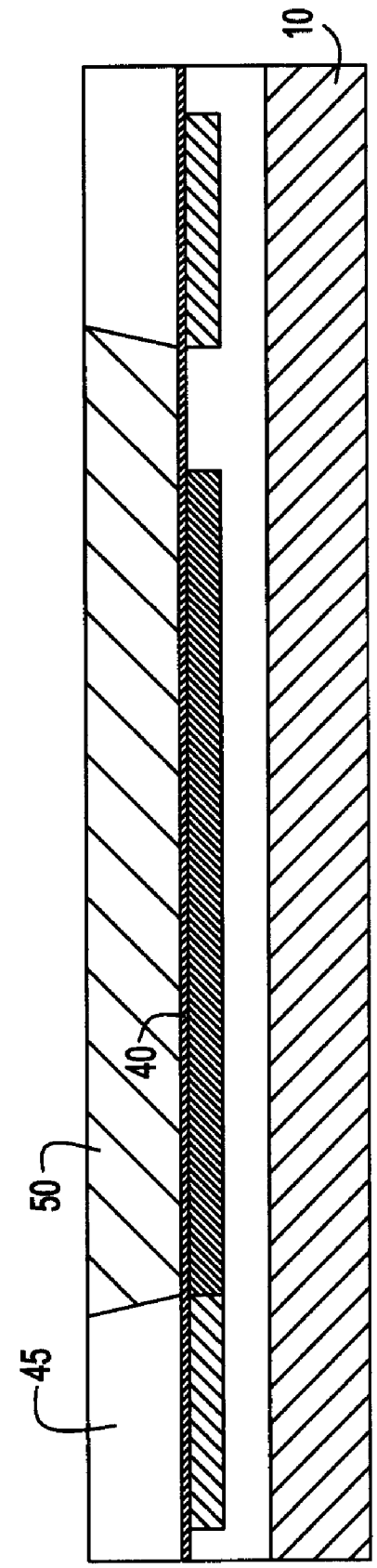
FIG. 8a
FIG. 8b

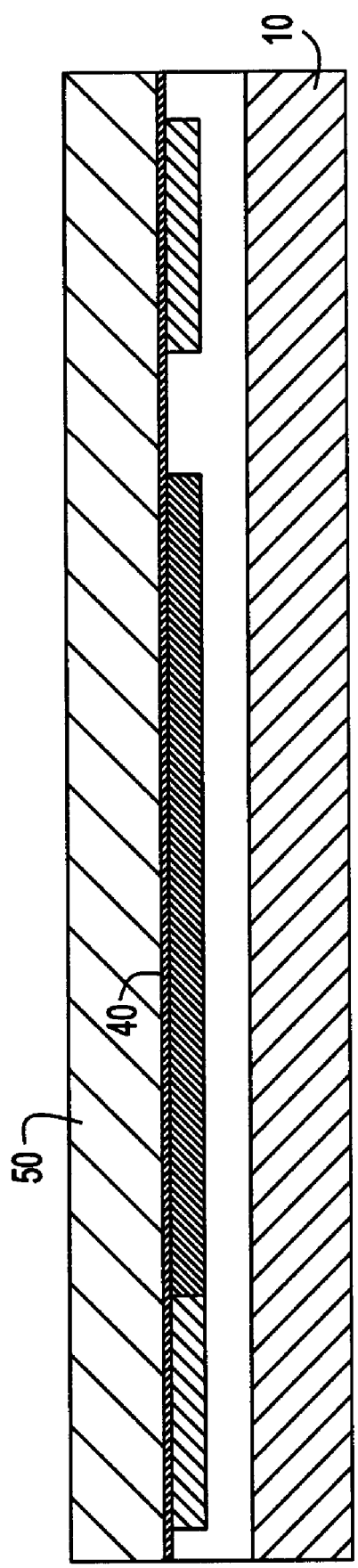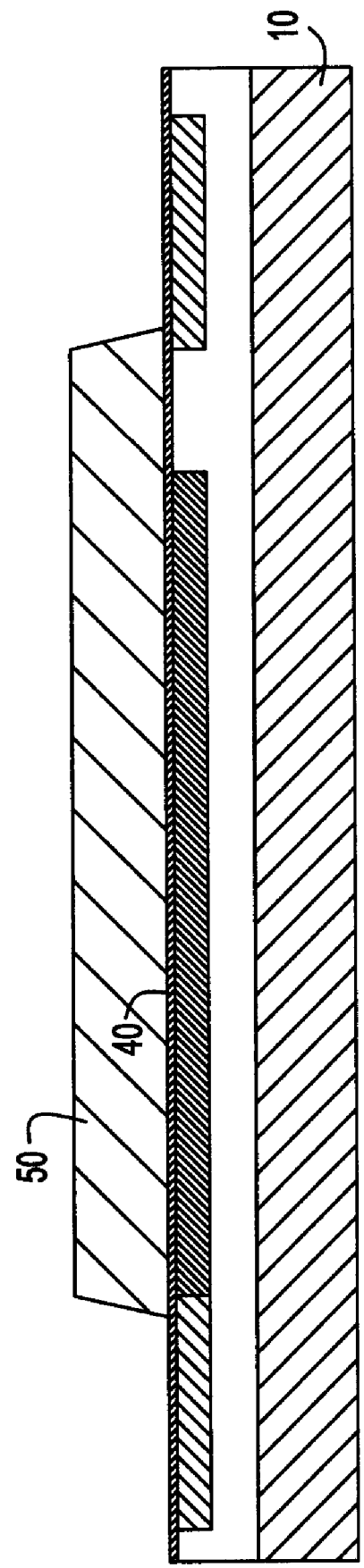
FIG. 9a
FIG. 9b

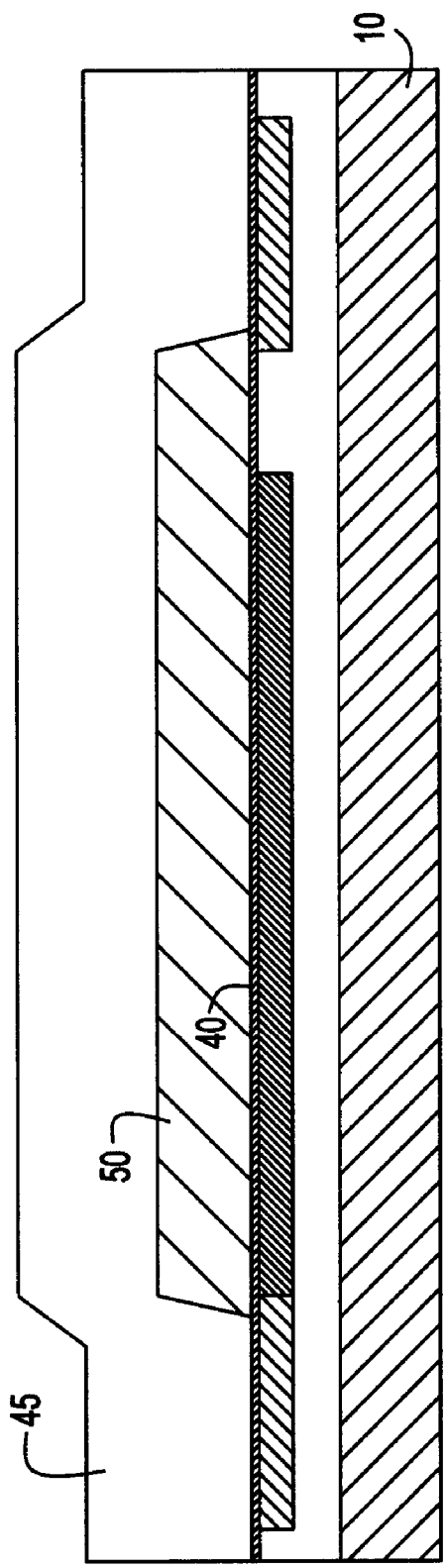
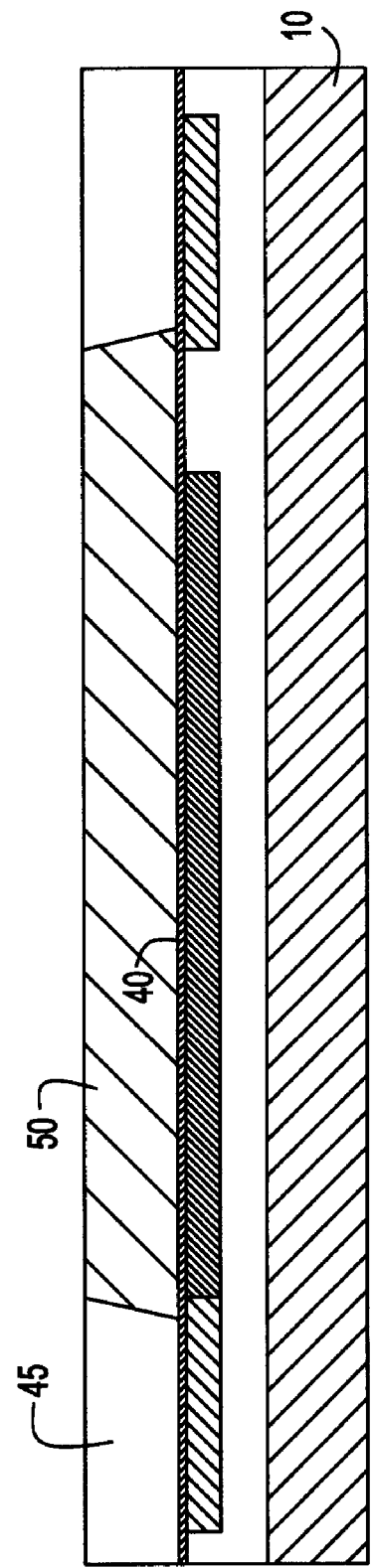
FIG. 9c
FIG. 9d

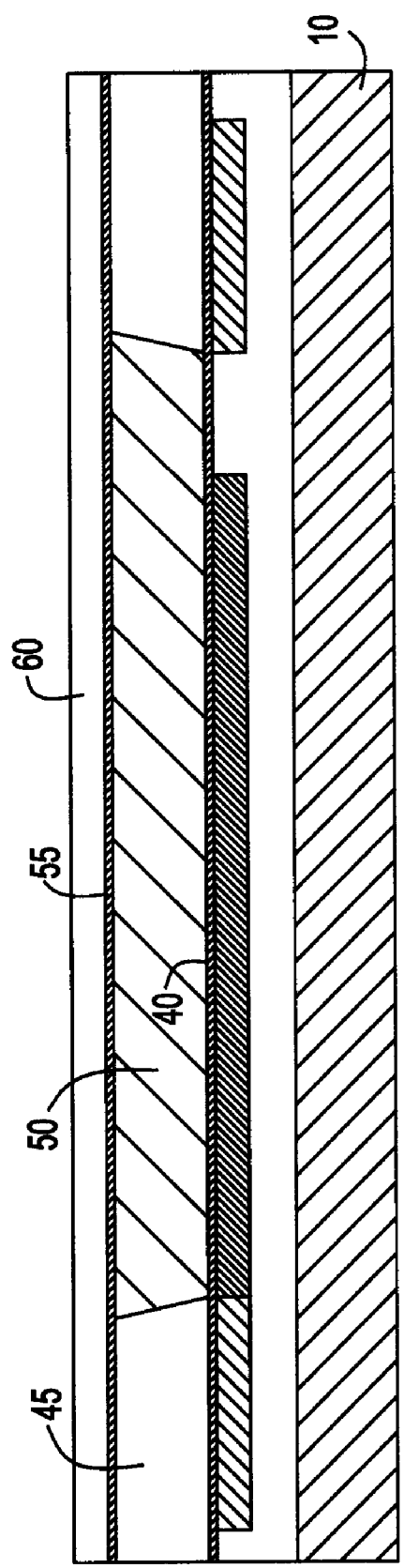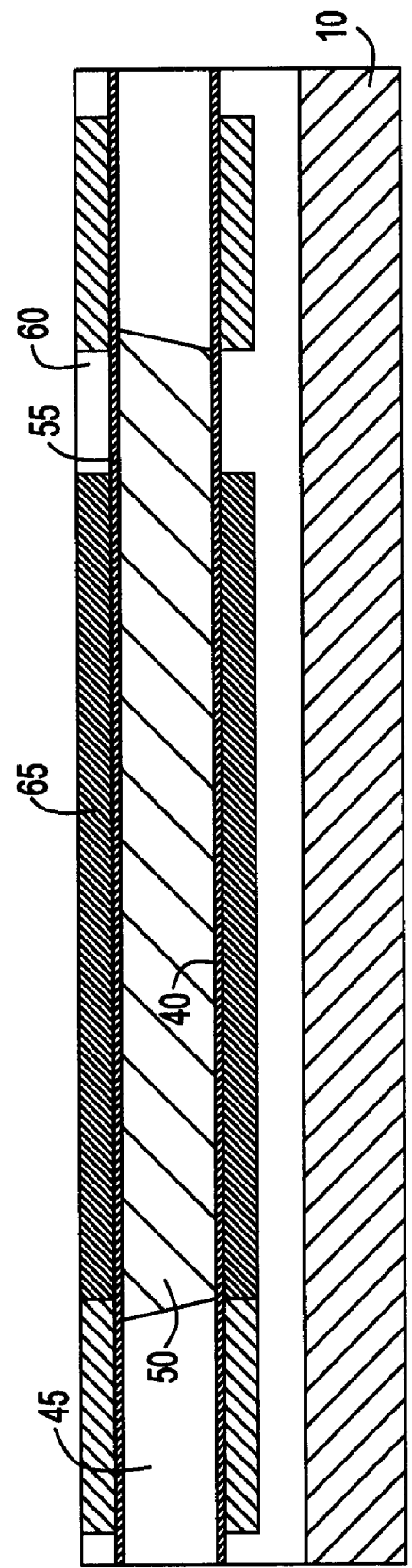

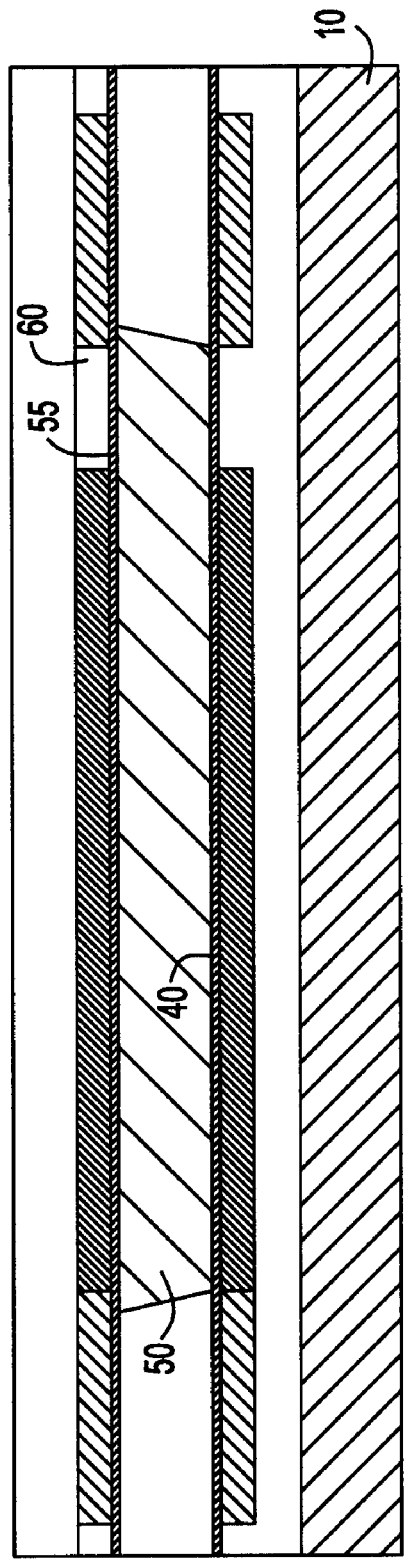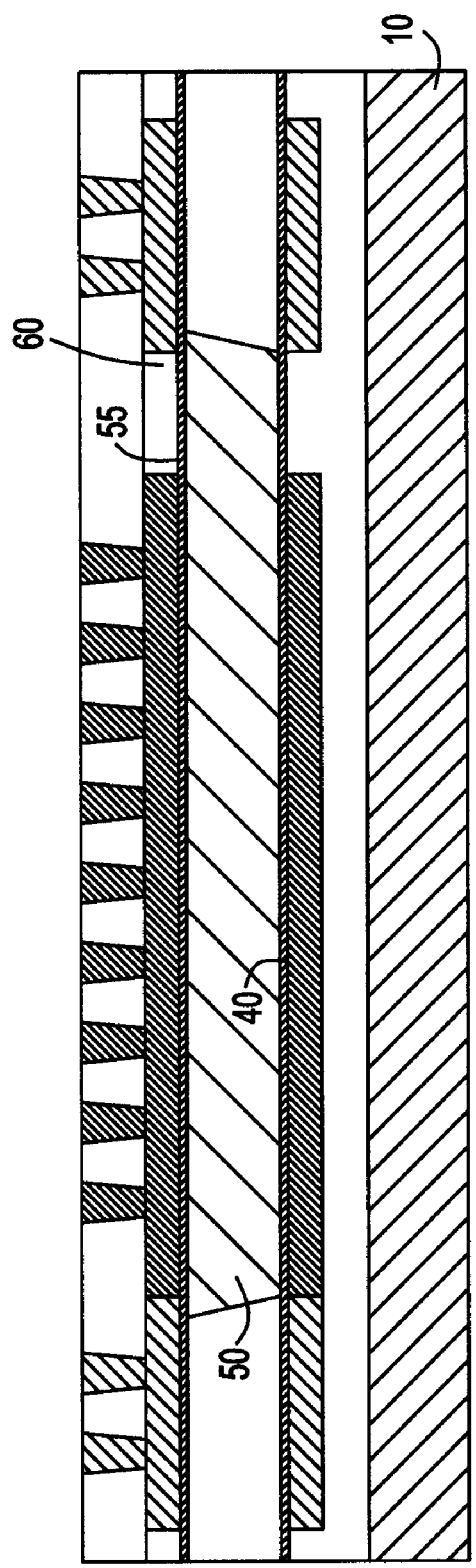
FIG. 12a
FIG. 12b

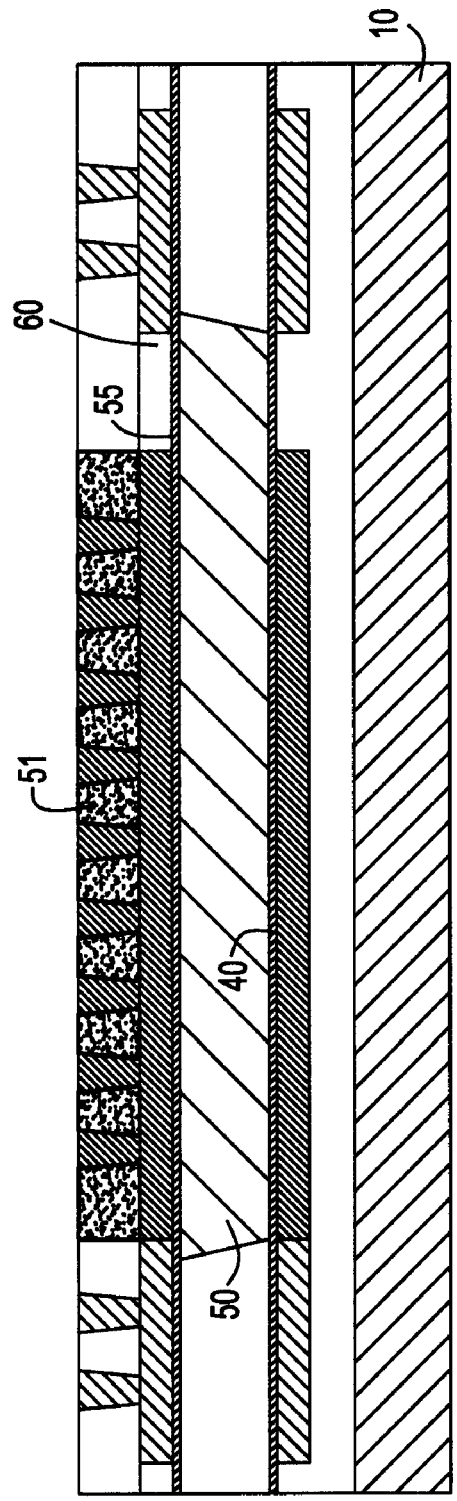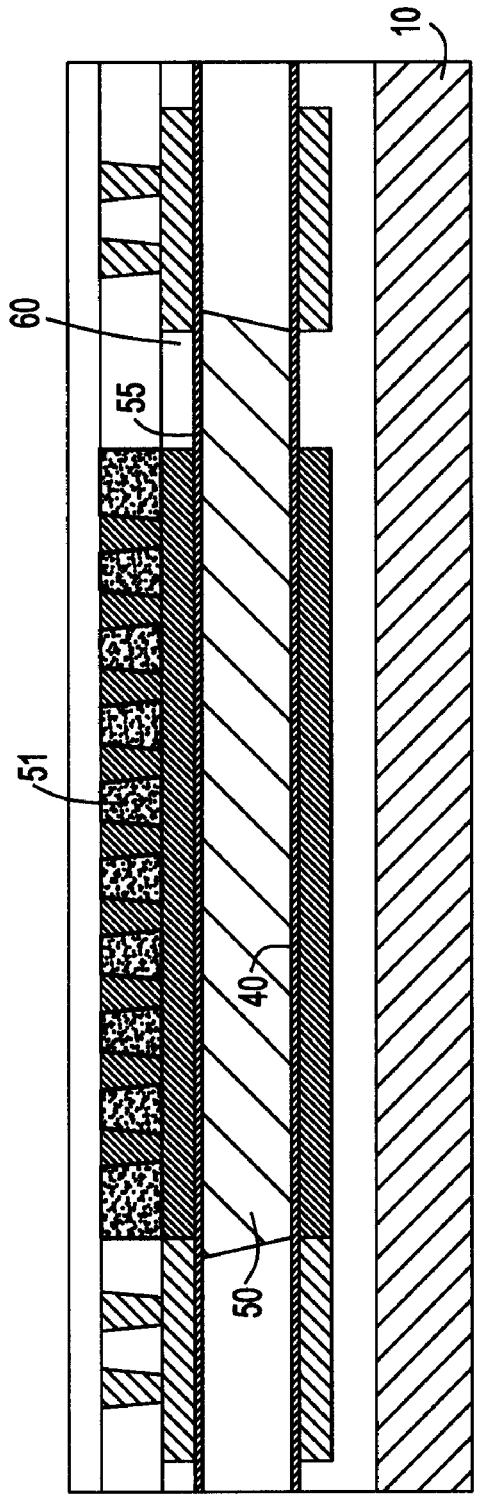
FIG. 12e
FIG. 12f

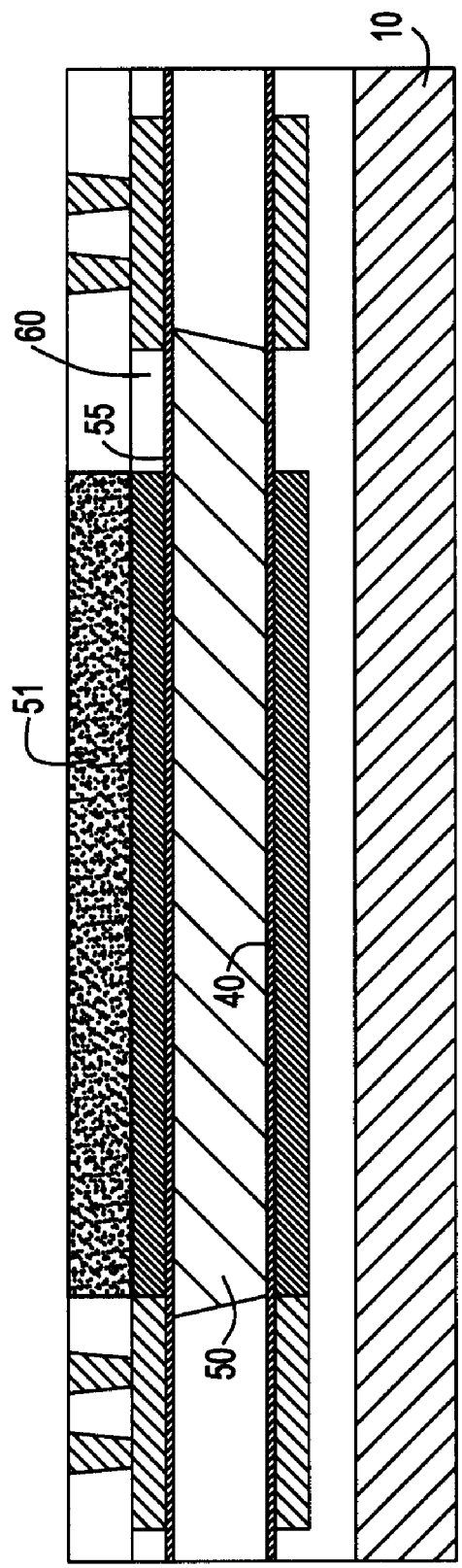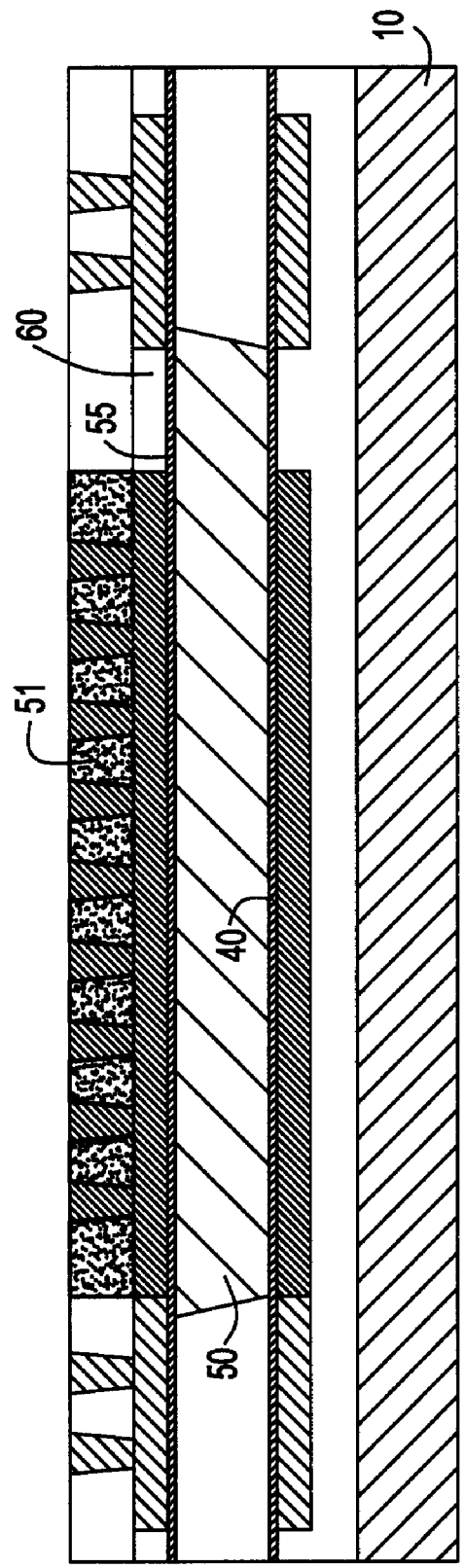
FIG. 13d
FIG. 13e

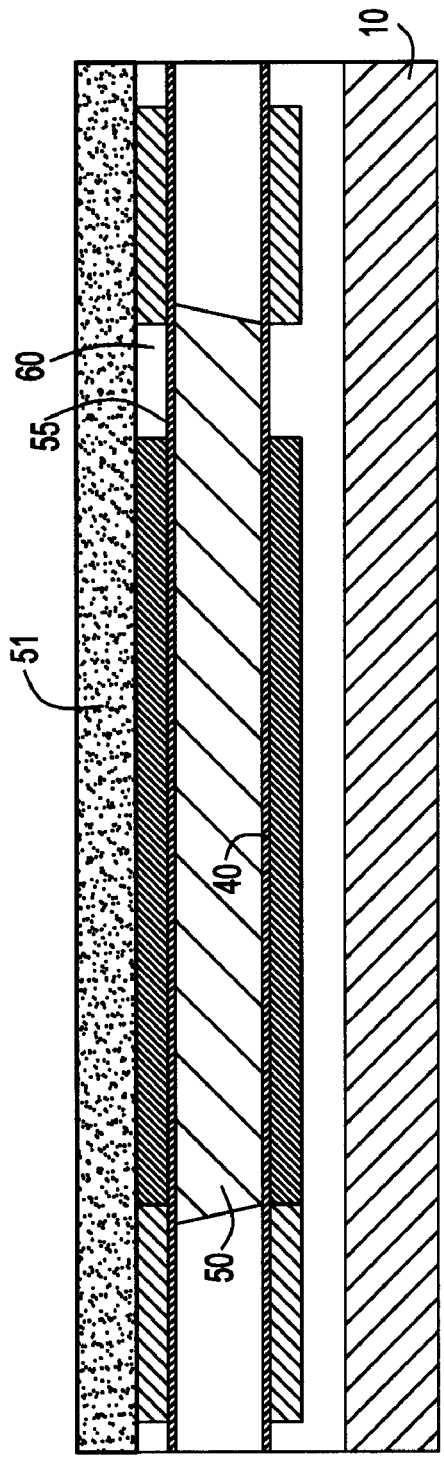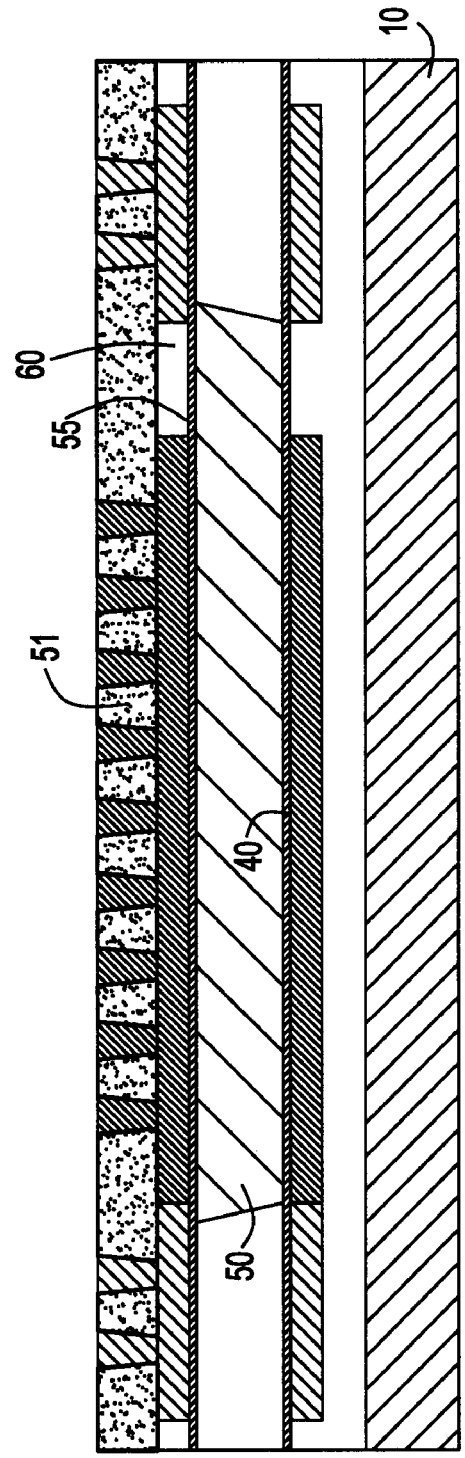
FIG. 14a
FIG. 14b

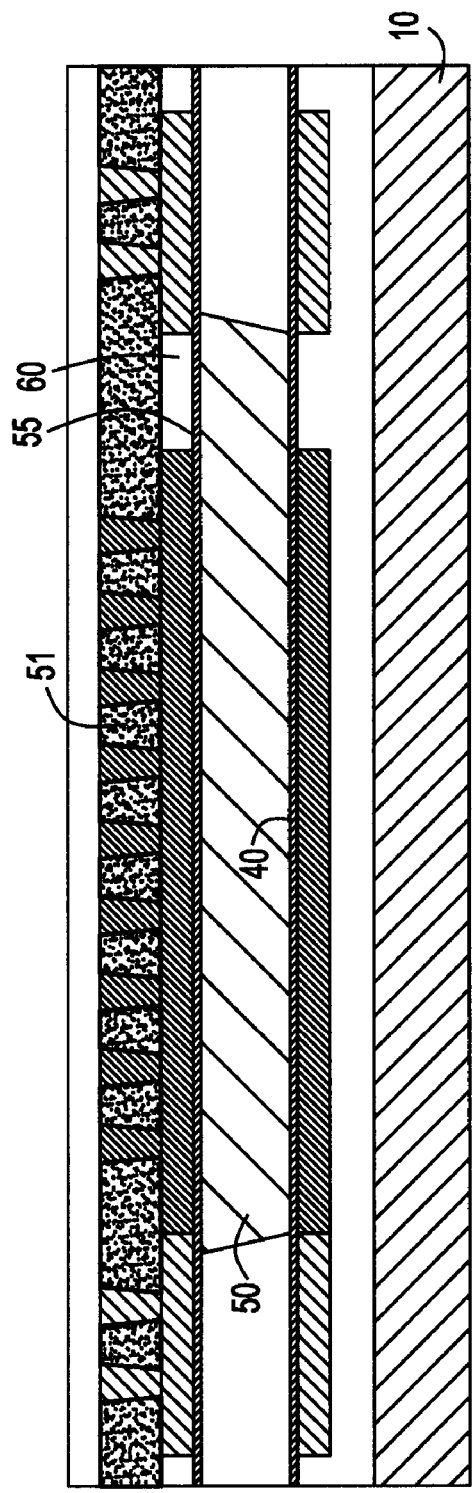
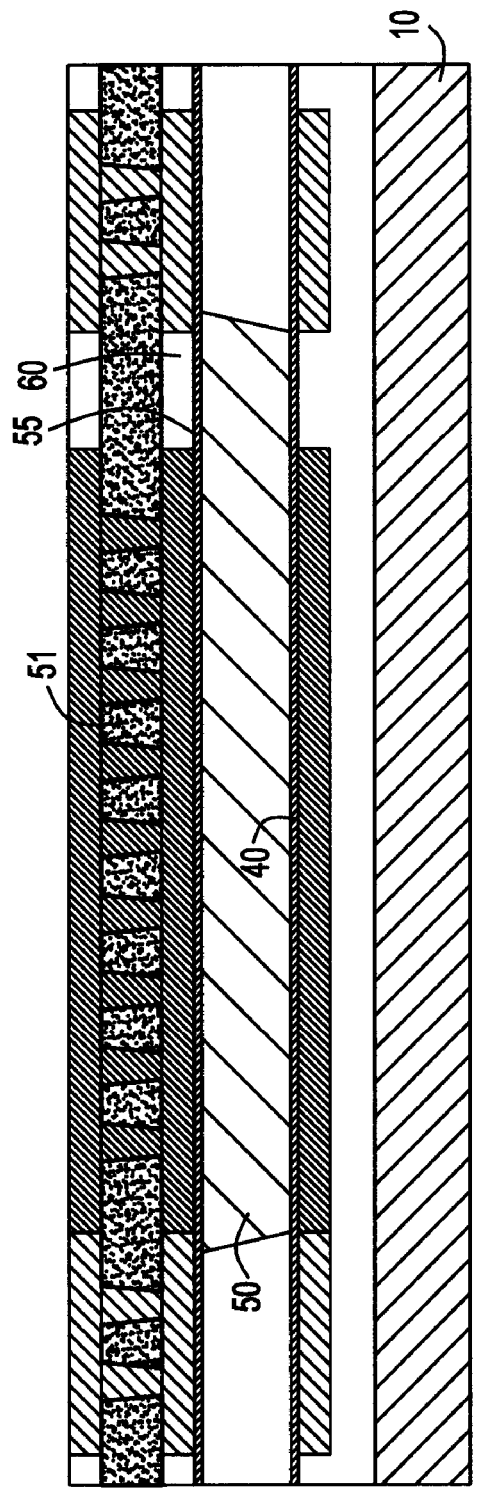
FIG. 14c
FIG. 15

ELASTOMERIC CMOS BASED MICRO ELECTROMECHANICAL VARACTOR

CROSS-REFERENCE TO RELATED APPLICATIONS

This application is related to patent application Ser. No. 10/710,283, Micro Electro-Mechanical Variable Capacitor, filed concurrently, and which is incorporated herein by reference.

BACKGROUND OF INVENTION

This invention is generally related to a micro-electromechanical system (MEMS) variable capacitor and, more particularly, to a method of fabricating an elastomeric MEMS varactor which can be fully integrated in current state of the art semiconductor fabrication processes.

Variable capacitors or varactors play a fundamental role in high-frequency and radio-frequency (RF) circuits. In the last few years, MEMS variable capacitors have drawn considerable interest due to their superior electrical characteristics. Variable capacitors using MEMS technology can be easily implemented in standard semiconductor devices for applications in aerospace, consumer electronics and communications systems. Researchers have attempted to improve the tuning range of MEMS variable capacitors since the maximum capacitance tuning range achieved by using a parallel plate electrode approach is limited. This is due to the non-linear electrostatic forces involved during actuation. The parallel plate electrodes exhibit a typical "pull-down behavior" at one-third the gap distance, leading to a maximum tuning capacitance of 1.5. Most previous approaches have resulted in an increased processing complexity and/or a large number of moving parts, leading to a drastic reduction in reliability. Additionally, packaging the MEMS device and integrating it into CMOS integrated circuit pose great challenges.

A. Dec et al., in an article entitled "RF micro-machined varactors with wide tuning range", published in the IEEE RF IC Symposium Digest, pp. 309-312, June 1998 describe building a MEMS variable capacitor by actuating the movable electrode using two parallel electrodes above and below the movable electrode. The total capacitance tuning range is significantly enhanced as a result of the individual capacitance between the top-movable and movable-bottom being in series. The maximum tuning range achievable using this approach is a ratio of 2:1. A. Dec et al. have reported achieving a tuning range as high as 1.9:1. Even though the tuning range significantly improves when using this approach, the process complexity increases correspondingly.

U.S. Pat. No. 6,661,069 describes a method of fabricating a micro-electro mechanical varactor device, wherein comb-drive electrodes are used for actuation. This approach is expected to produce a very large tuning range, but it involves fabricating the device on two separate substrates. Primary mode of actuation is between the fin structures in this device. Further the device is a three port varactor device and does not offer multiple modes of actuation for enhancing the tuning range of the device.

The inherent electro-mechanical aspects involved in the present approach are quite different than a parallel plate approach and the methods discussed above. Movable comb-drive electrodes are used for capacitance sensing and separate actuation electrodes are used for actuation of the movable comb drive electrodes. The capacitance can be varied by actuating one or more of the electrode fingers and thereby varying the overlap area between the comb electrodes. The capacitance tuning range of the device is greatly enhanced, since multiple modes of actuation are possible in this device. Since this device has multi ports (at least two ports for DC bias and two port for the RF signals), the signal capacitance does not require decoupling as is the case in a regular 3-port varactor device. The device can be fabricated using standard semiconductor fabrication techniques and easily integrated into semiconductor circuits. Accordingly, it is an object of the invention to provide a method of fabricating a MEMS variable capacitor device that utilizes multi-fingered three-dimensional comb drive electrodes for sensing while the control or actuation electrodes drive the motion of the movable comb drive electrodes either individually or all at once, sg to a change in capacitance. It is a further object to provide a method of fabricating a MEMS variable capacitor device (i.e., varactor) using manufacturing techniques that are compatible with those applicable to CMOS semiconductor devices, which allows to simultaneously fabricate and package the MEMS device while reducing to a minimum the number of fabrication steps while decreasing the cost of processing.

It is another object to provide a method of fabricating a MEMS varactor that includes embedding elastomeric material between the vias within the movable electrodes in order to provide mechanical support to the vias.

It is still another object to provide a method of fabricating a MEMS varactor that combines a CMOS manufacturing process and which includes the use of a deformable elastomeric material to enable the varactor exhibit large changes in conducvity for a small amount of displacement.

SUMMARY OF INVENTION

In a first aspect of the invention, the MEMS variable capacitor described includes conventional CMOS manufacturing steps in combination with elastomeric material selectively used in areas under greatest stress to ensure that the varactor will not fail as a result of stresses that may result in the separation of dielectric material from the conductive elements of the device.

In another aspect of the invention, the MEMS varactor is provided with a controlled stress gradient, leading to an initial curvature of the movable electrodes. The intrinsic stress and stress gradient in the movable electrodes changes by altering the deposition conditions of the electrode material and by varying the thicknesses of the components of the electrode materialIn still another aspect of the invention, the combination of CMOS process steps in the presence of conducting elastomeric material between the vias increases the overall sidewall area, leading to the added advantage of an increased capacitance density in the overall MEMS varactor device capacitance.

In yet a further aspect of the invention, movable electrodes are formed by fabricating series of metal lines with interconnecting vias, wherein the metal lines are aligned on top of one another and the movable electrodes are adjacent to each otherforming the plates of the capacitor.

In still a further aspect of the invention, there is provided a method of fabricating a micro-electromechanical system (MEMS) variable capacitor that includes the steps of: a) depositing a first dielectric layer on a substrate, the first dielectric layer having at least one cavity etched therein; b) forming an actuation electrode by filling with metal and then planarizing the at least one cavity; c) depositing a second dielectric layer on the first dielectric, and etching at least one cavity therein; d) filling and planarizing the at least one cavity in the second dielectric with sacrificial material; e) depositing a third dielectric layer on the second dielectric and etching at least one cavity therein; f)forming a ground plane electrode by filling with metal and then planarizing the cavity in the third dielectric; g) forming a plurality of metal lines on top of the third dielectric interconnected by way of a plurality of vias; h) embedding elastomeric material between the vias; and i) selectively removing the second and third dielectric material surrounding the metal lines and the ground electrode, and etching away the sacrificial material.

BRIEF DESCRIPTION OF DRAWINGS

These and other objects, aspects and advantages of the invention will be better understood from the detailed preferred embodiment of the invention when taken in conjunction with the accompanying drawings.

FIGS. 7 through 8b depict cross sectional views of the process sequence for embedding sacrificial material in the dielectric.

FIGS. 9a through 9d are cross sectional views of a second process sequence for embedding sacrificial material in the dielectric.

FIGS. 10 and 11 show cross sectional views of the process sequence wherein the next level metal interconnects are shaped to form the electrode.

FIGS. 12a through 12g are cross sectional views of the process sequence to incorporate elastomeric material between the via interconnections.

FIG. 13a through 13f are cross section views of another method for incorporating elastomeric material between the vias.

FIG. 14a through 14c and FIG. 15 ares cross section views of the method in which elastomeric material is embedded within the via interconnects over the entire substrate.

DETAILED DESCRIPTION

The present invention will now be described more fully hereinafter with reference to the drawings, in which preferred embodiments are shown.

Figure 1:
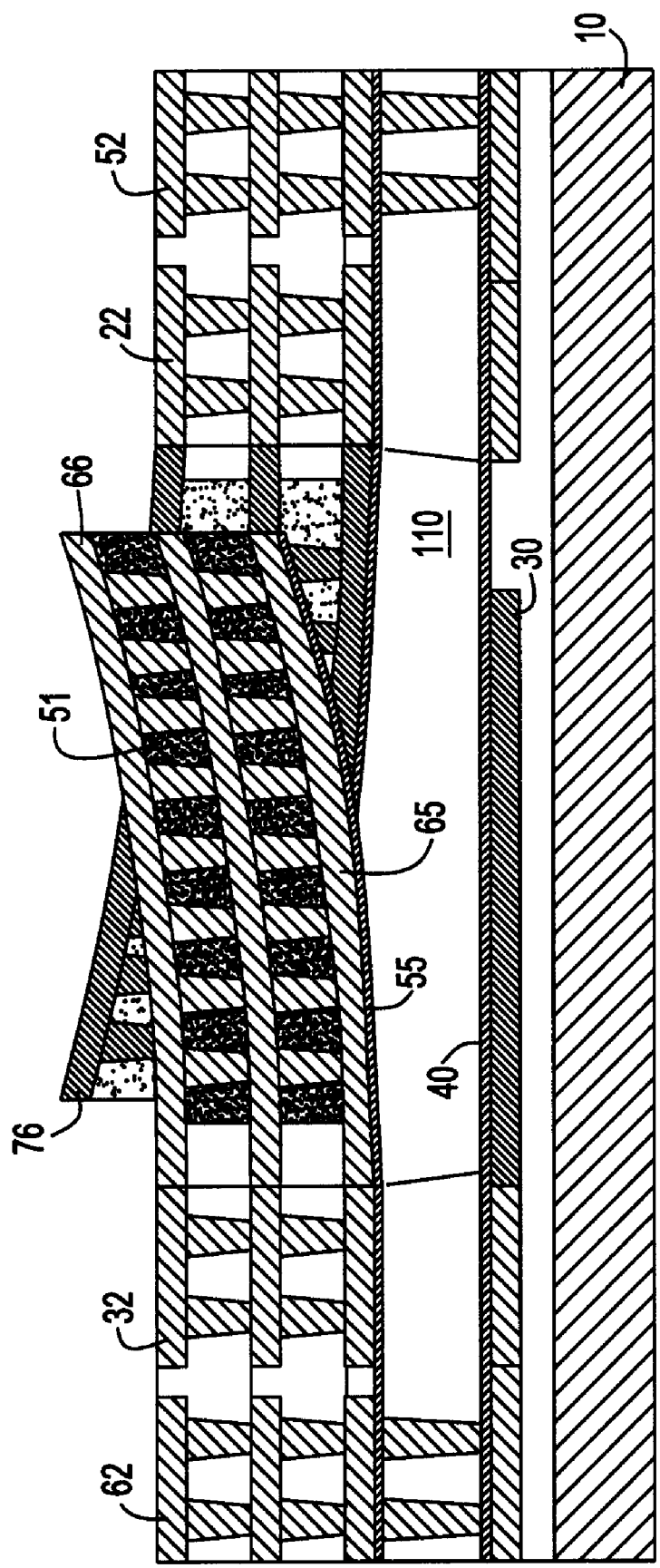
FIG. 1 is a cross section view of the MEMS capacitor depicting two interdigitated electrodes, positive and negative electrodes, as seen from a cut through the lines A-A" shown in FIG. 2, in accordance with the invention.

Referring to FIG. 1, there is shown a cross section view of the micro electromechanical system (MEMS) variable capacitor, in accordance with the invention. The device is built on a substrate 10 upon which movable electrodes 76 and 66 and fixed electrode 30 are sequentially constructed using conventional semiconductor fabrication techniques. The electrodes 76 and 66 are built in a comb-drive electrode configuration wherein one end of the comb-drive finger is fixed in space, while the second is free to move, as described in patent application Ser. No. 10/710,283. The capacitance of the varactor is determined by the overlap sidewall area between the two electrodes (i.e., the metal in one movable electrode facing the corresponding metal in the second) and the spacing between the two electrodes. Electrodes 76 are preferably made of multi-layered metallization connected by way of vias separated from each other by elastomeric material 51. The elastomeric material provides the necessary support to the vias during operation of the final structure. Additionally, the conductivity of the elastomeric material changes upon actuation of the device, leading to an increased sidewall area overlap between electrodes 76 and 66. The bottom electrode 65 of the movable comb drive finger acts as the ground plane electrode for actuation electrode 30. Electrodes 65 and 30 are of opposing polarity and are separated by an air gap 110. The voltage potential between electrodes 65 and 30 generates an electrostatic force that pulls combdrive electrode 76 towards the substrate. This, in turn, creates a change in the over-lap sidewall area between electrodes 76 and 66, leading to a change in capacitance between the two fingers structure. The ground plane electrode 65 and actuation electrode 30 are electrically isolated by insulating layers 55 and 40, respectively. This isolation is required to avoid creating an electrical short between the electrodes 65 and 30 upon actuation. Actuation electrode 30 is connected to metal pad 62 through metal interconnections, providing an option for simultaneous or individual actuation. The metal strap pads 32 and 22 are used for RF sensing pads while actuation metal pads 52 and 62 operate as DC actuation pads.

Figure 2:
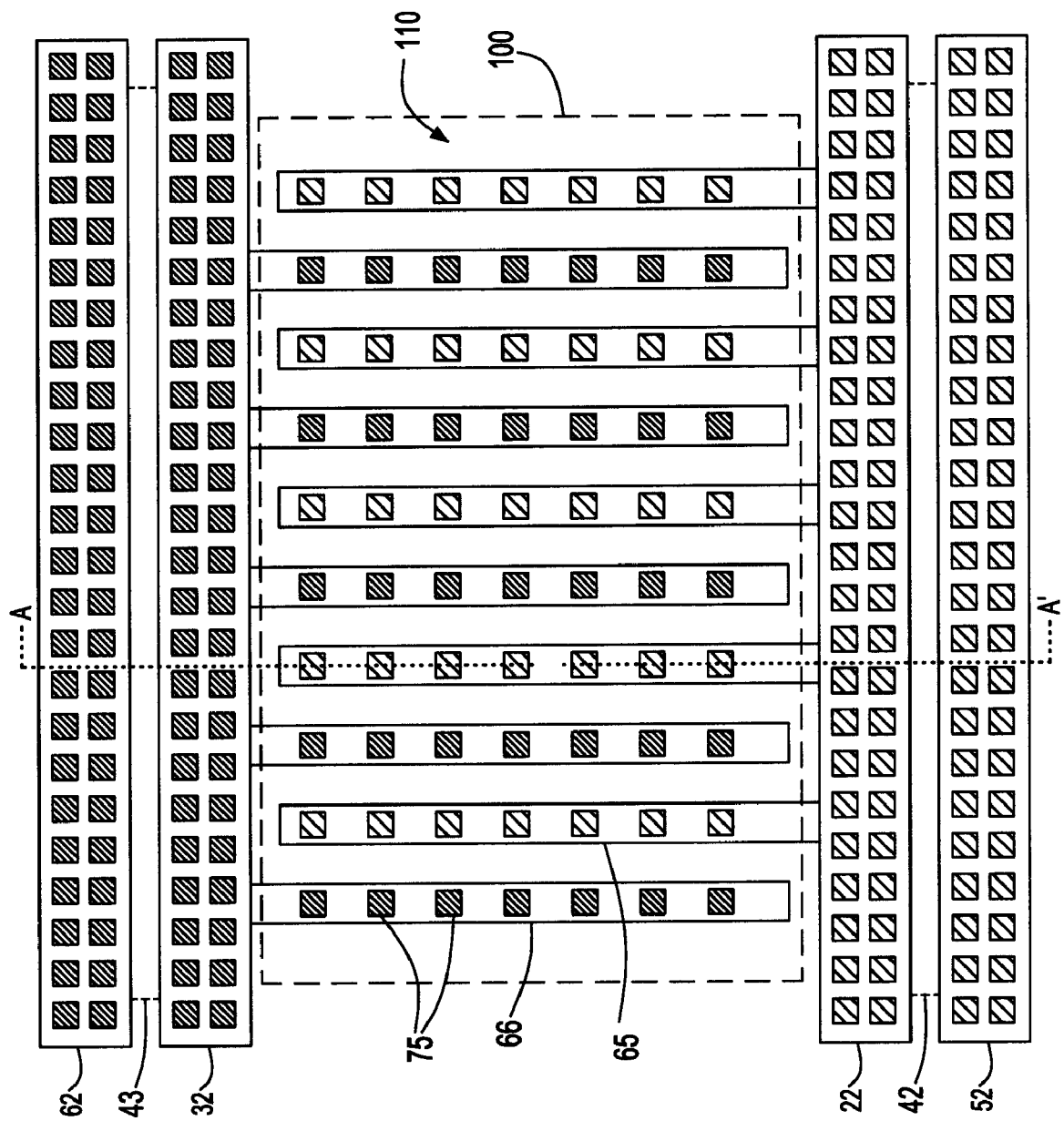
FIG. 2 is a top down view of the functional MEMS variable capacitor device, according to the invention.

FIG. 2 shows a top-down view of the functional MEMS variable capacitor device. The varactor is formed by interdigitated comb-drive electrodes separated from each other by a predetermined distance. The electrodes 76 and 66 are fully populated across the width of the capacitor device. The length of the device is determined by the overlap length of the previously described interdigitated electrodes. Electrodes 76 and 66, forming the two electrodes of the MEMS variable capacitor, are electrically isolated and of opposite polarity. The gap between the two electrodes and the sidewall overlap area therebetween determines the overall capacitance of the device. The electrodes, as shown, are preferably formed in an interdigitated comb-drive configuration, and are connected through metal via connections 75 along the finger length. The conductive via connections 75 are spaced at fixed intervals and fully populated, preferably along the entire length of the actuation electrodes 66 to maximize the sidewall area of the comb electrodes. In order to maximize the capacitance, the metal in one of the movable electrodes faces the corresponding metal in the second electrode.

The boundary defined by shape 100 shows the cavity area within air gap 110 wherein the movable electrodes 10 and 20 are to be formed. Still referring to FIG. 2, the metal via interconnections 75 are embedded in an insulating dielectric or in elastomeric material 41. Deformable elastomeric material is deposited over insulating dielectrics such as $SiO_2$, SiN, SiCOH, and the like, in view of its elastic properties which provide better mechanical support to the via interconnections during release and operation of the device.

Figure 3:
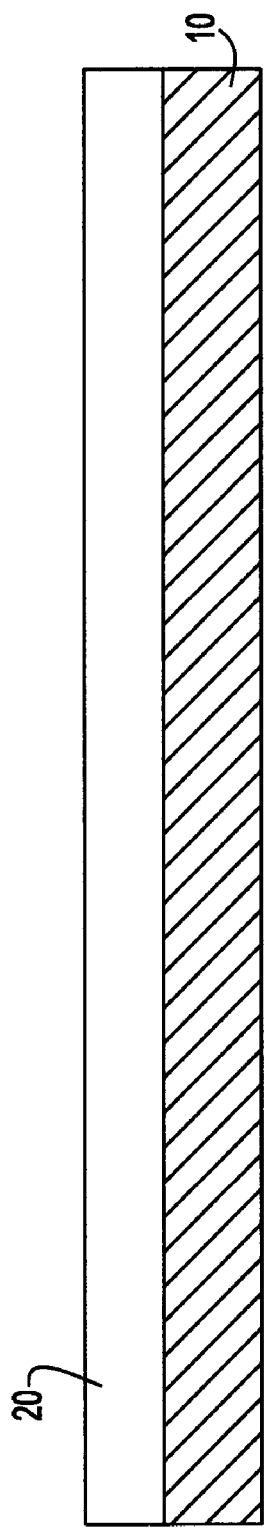
FIGS. 3 through 6 show cross section views of the process sequence for fabricating metal interconnects using damascene process over a substrate.
Figure 4:
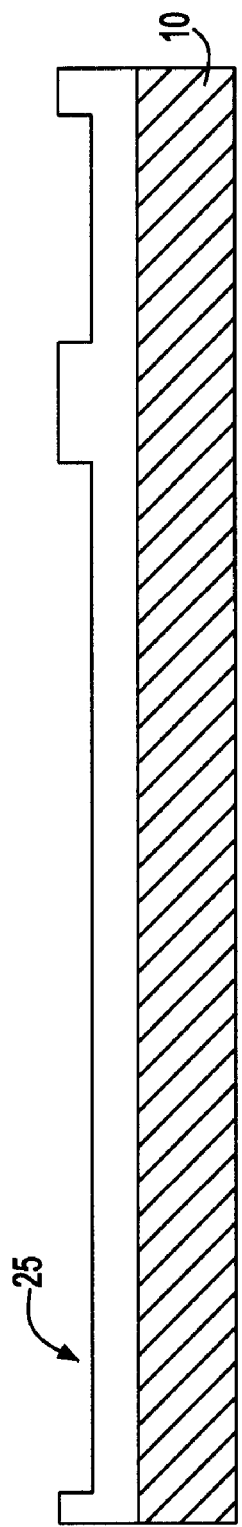
Figure 5:
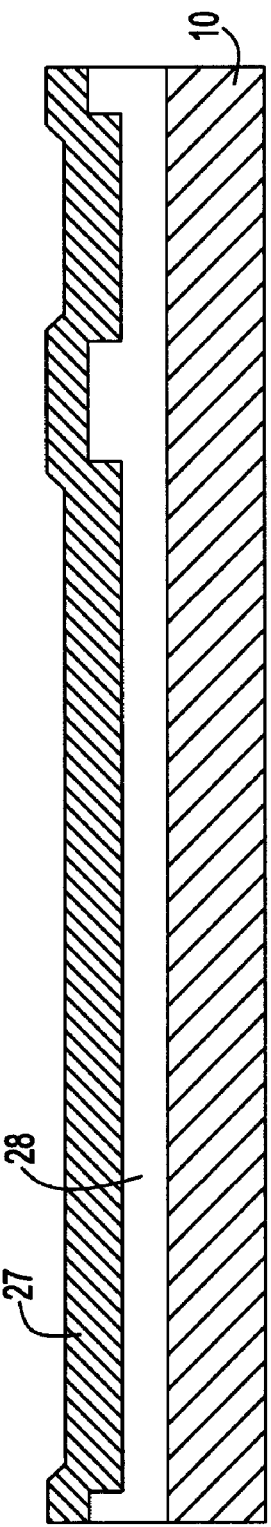
Figure 6:
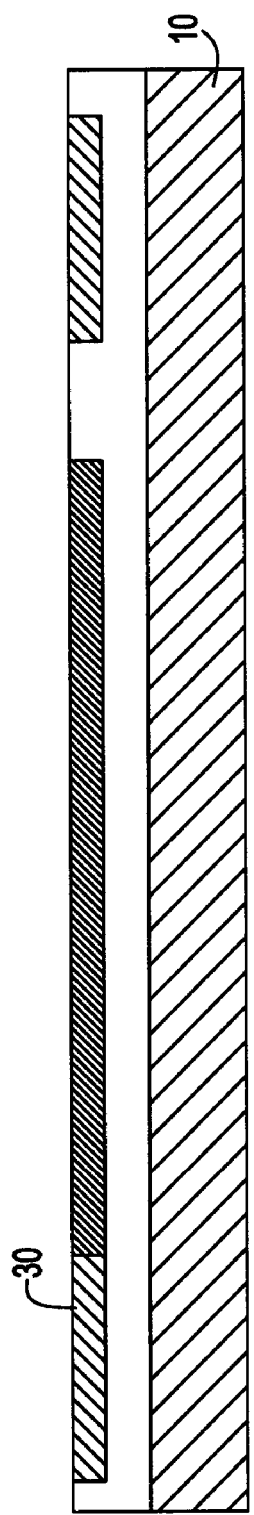

FIGS. 3 through 21 illustrate details of the process sequence used for fabricating the MEMS variable capacitor device of the present invention. A step by step process sequence is described briefly below:FIG. 3 shows the first step of insulating or semi-insulating material 20 deposited on top of substrate 10. The insulating material is preferably made of $SiO_2$, SiN, SiCOH, SiCN, and the like. Preferably, the thickness of the material 20 matches or exceeds the metal thickness above the substrate. FIG. 4 shows cavity 30 within material 20 formed over the chip-side substrate 10 and formed using conventional semiconductor lithography and patterning techniques. A liner and seed copper material are then deposited over the cavity and followed by metallization, preferably copper plating, as shown in FIG. 5. The copper metal lines 30 shown in FIG. 6 are then formed using chemical mechanical planarization (CMP) during which the copper metal is planarized, stopping on the underlying dielectric. The seed copper and liner (i.e., barrier metal) are then removed. The formation of metal layers in etch cavities is commonly referred to in industry as a damascene process. This process is repeated at each metal level to form the metal and the interconnections. First metal 30 fabricated during this process shapes the actuation electrode of the MEMS variable capacitor device.

Figure 7:
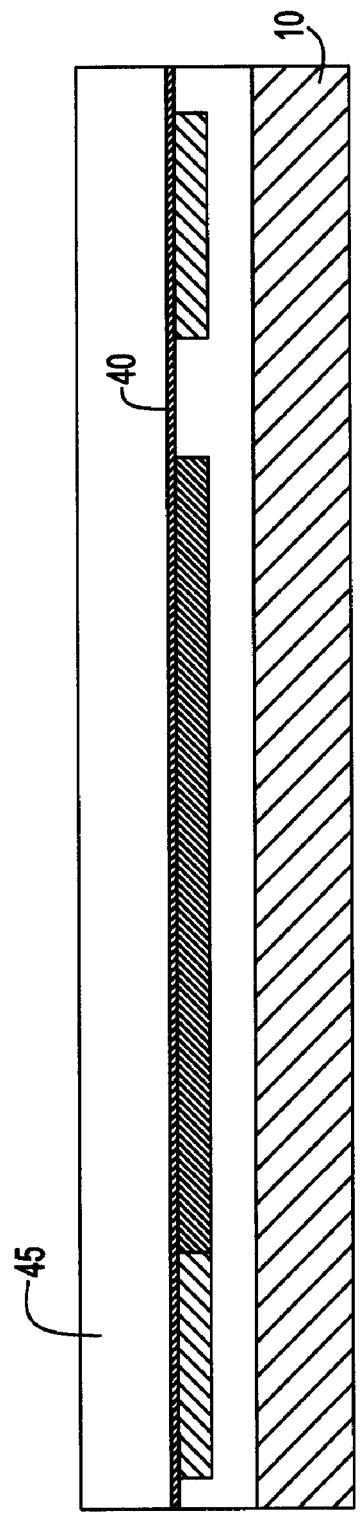

Insulating dielectric 40, preferably SiN or SiCN, and the second interlevel dielectric 45 are then deposited on top of the first metal level, as shown in FIG. 7. The first insulating dielectric 40 acts as a capping material to the metal layer, and as an etch stop for future processing. The second dielectric 45 provides the necessary separation between the actuation electrode and the movable electrode to be formed above this level. The first dielectric layer 13 is typically made of SiN or SiCN, with a thickness ranging between 200 Å and 700 Å. The separating interlevel dielectric (ILD) is preferably made of $SiO_2$, flourinated $SiO_2$, SiCOH, or any low-K dielectric having a thickness ranging between 2000 Å to 10000 Å.

A cavity mask is then used to pattern and etch the dielectric, as illustrated in FIG. 8a. During the etch process, layer 40 acts as an etch stop in order to avoid damaging the surface underneath it. Sacrificial material 50 is then deposited over the cavity and planarized, stopping at the ILD dielectric, as shown in FIG. 8b. The sacrificial material can also be embedded within the dielectric by depositing sacrificial material after the insulating material 40 on top of the first metal level (FIG. 9a). The sacrificial material 50 is then patterned using a reverse tone resist to keep sacrificial material of known thickness over the first metal level (FIG. 9b). An interlevel dielectric 45 is then deposited over the sacrificial material and planarized, stopping at the sacrificial material (FIGS. 9c and 9d). The sacrificial material is preferably made of SiLK, DLC (Diamond like carbon) or any polynorbornene based polymer. The height of the sacrificial material preferably ranges between 2000 Å and 7000 Å.

FIG. 10 illustrates the process sequence wherein insulating material 55 and ILD 60 are sequentially deposited on top of the planarized sacrificial material.

FIG. 11 shows a cross sectional view of the structure wherein metal lines 65 are created using the damascene process sequence, as described above. Metal lines are embedded within the dielectric 60 over the sacrificial material 50. The metal line 65 becomes an integral part of the electrode of the device.

Figure 12C:
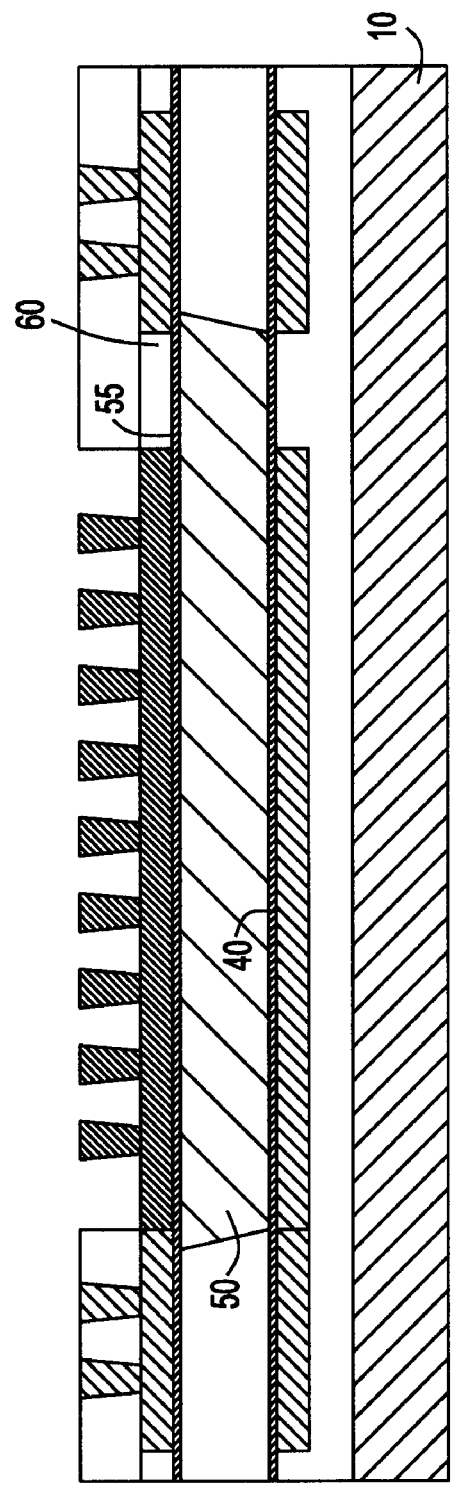
Figure 12D:
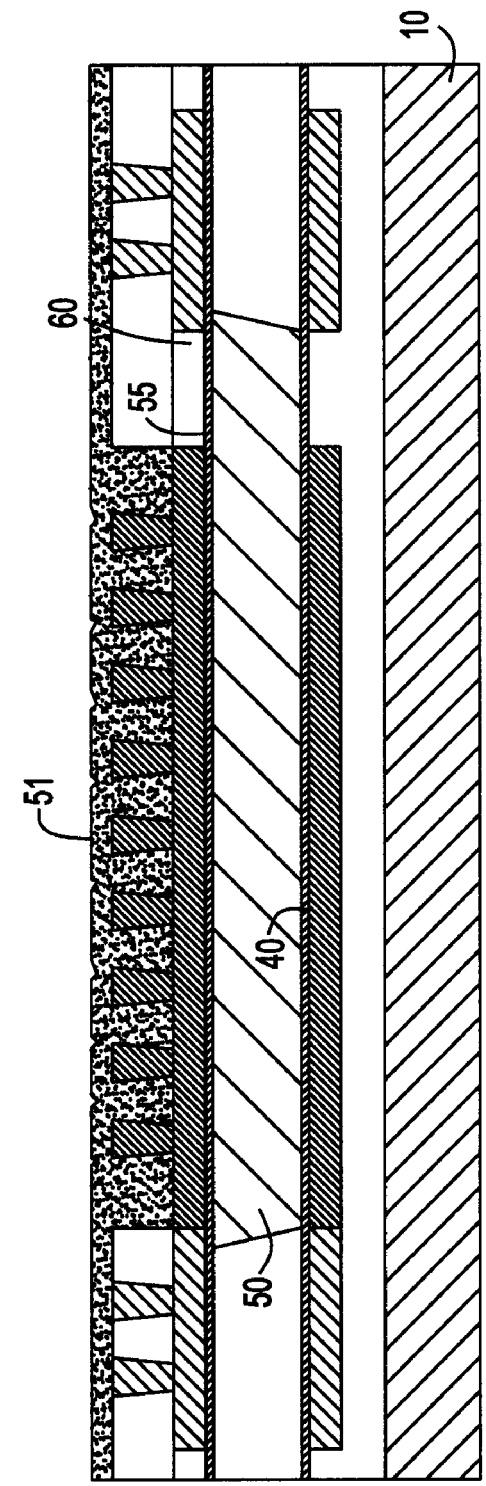
Figure 12G:
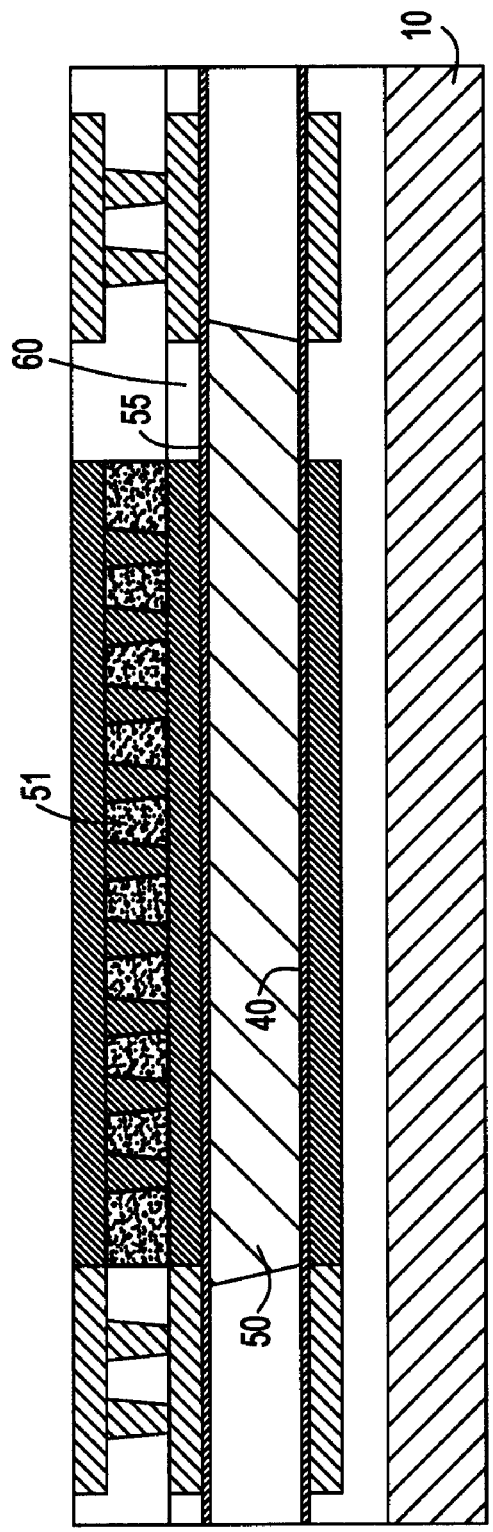

FIGS. 12a-12g illustrate the process sequence for embedding elastomeric material, 51 between the via interconnects to improve its reliability. FIG. 12a illustrates the step wherein the first metal line, integral to the movable electrode is formed. Shown in FIG. 12b is the step illustrating the formation of via interconnects using a single damascene process. The area on top of the movable electrode is then patterned, followed by etching the interlevel dielectric, as seen in FIG. 12c. In FIG. 12d, the elastomeric material is deposited filling gaps between the via interconnects, followed by planarization, as illustrated in FIG. 12e. In FIG. 12f, the cross sectional view shows the interlevel dielectric deposited thereon, forming the next level of metal. In FIG. 12g, the final encapsulation step shows the second metal line formed by a single damascene process.

FIGS. 13a through 13f illustrate another process sequence for embedding the elastomeric material 51 between the via interconnects of the movable electrode.

Figure 13A:
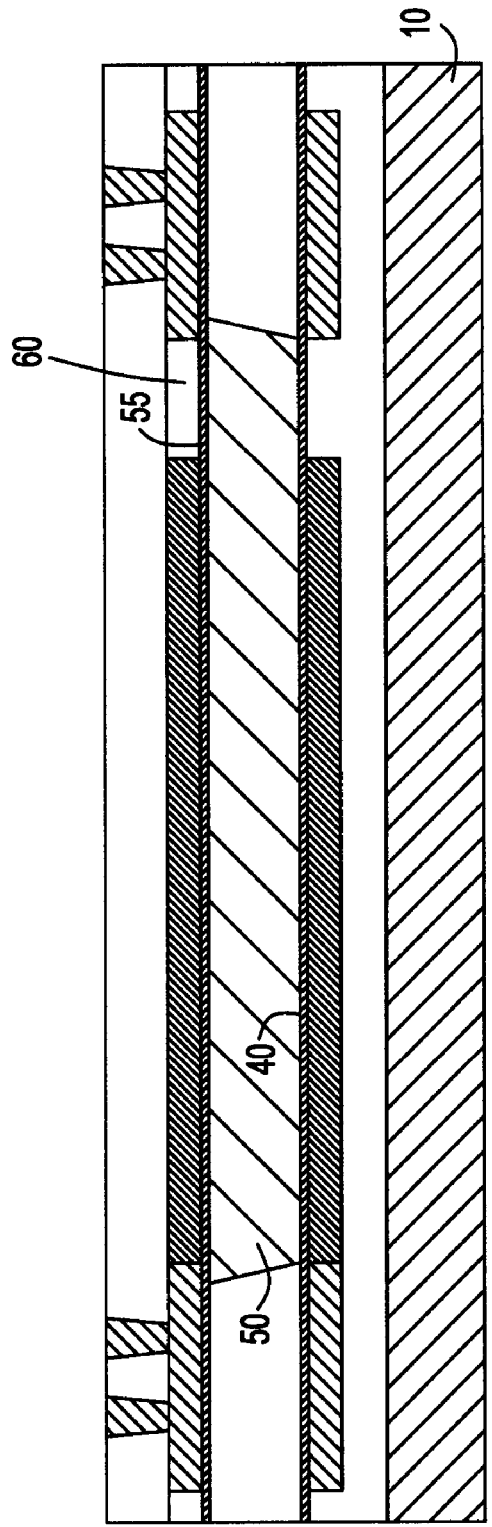
Figure 13B:
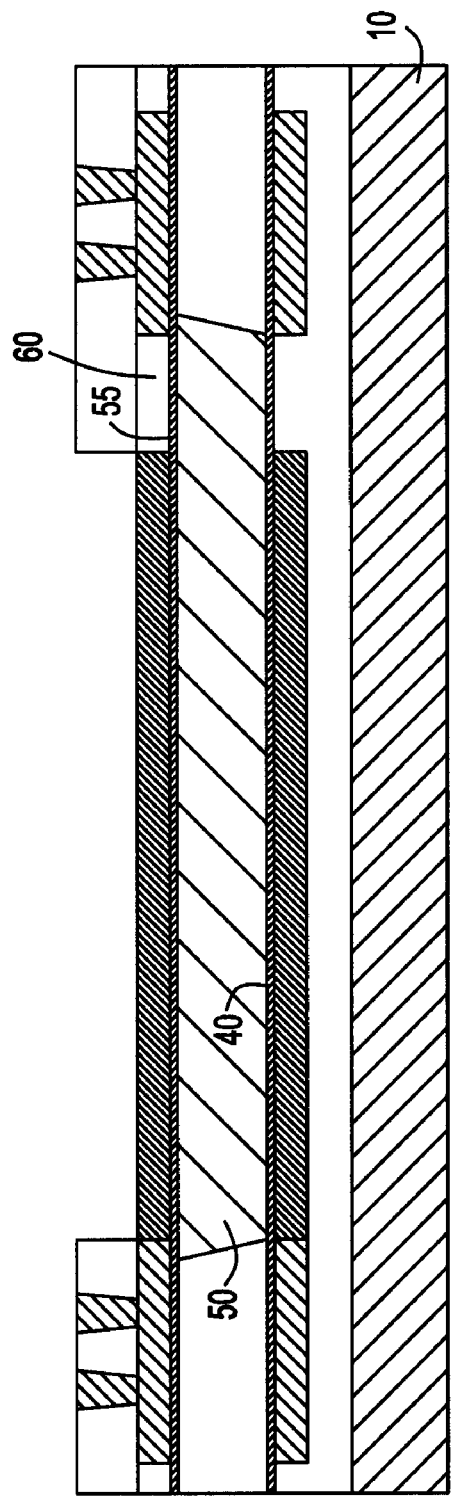
Figure 13C:
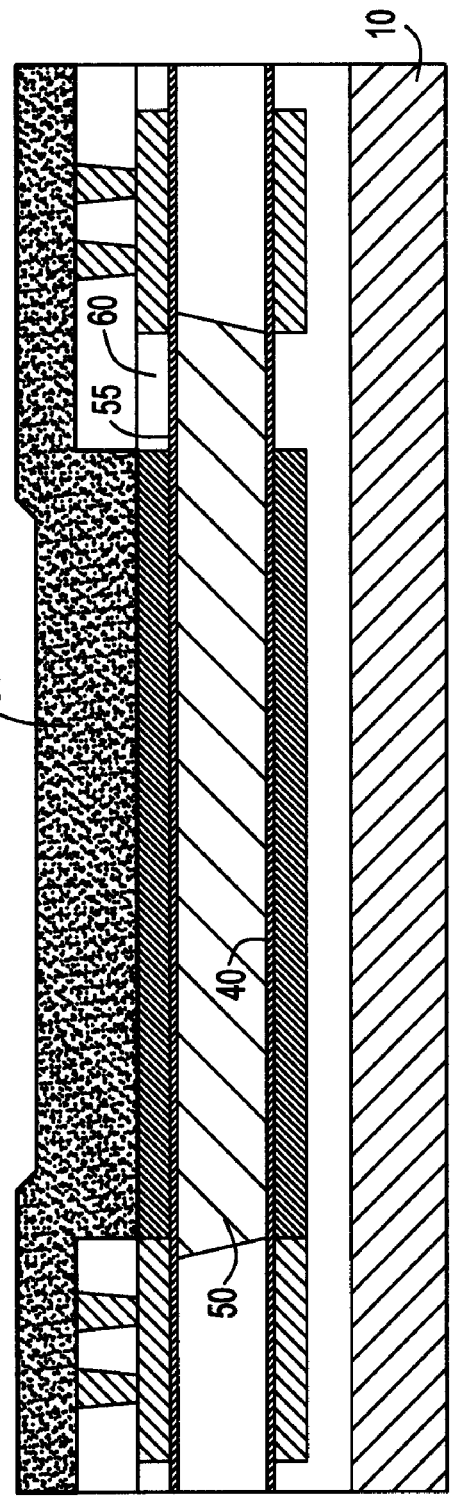
Figure 13F:
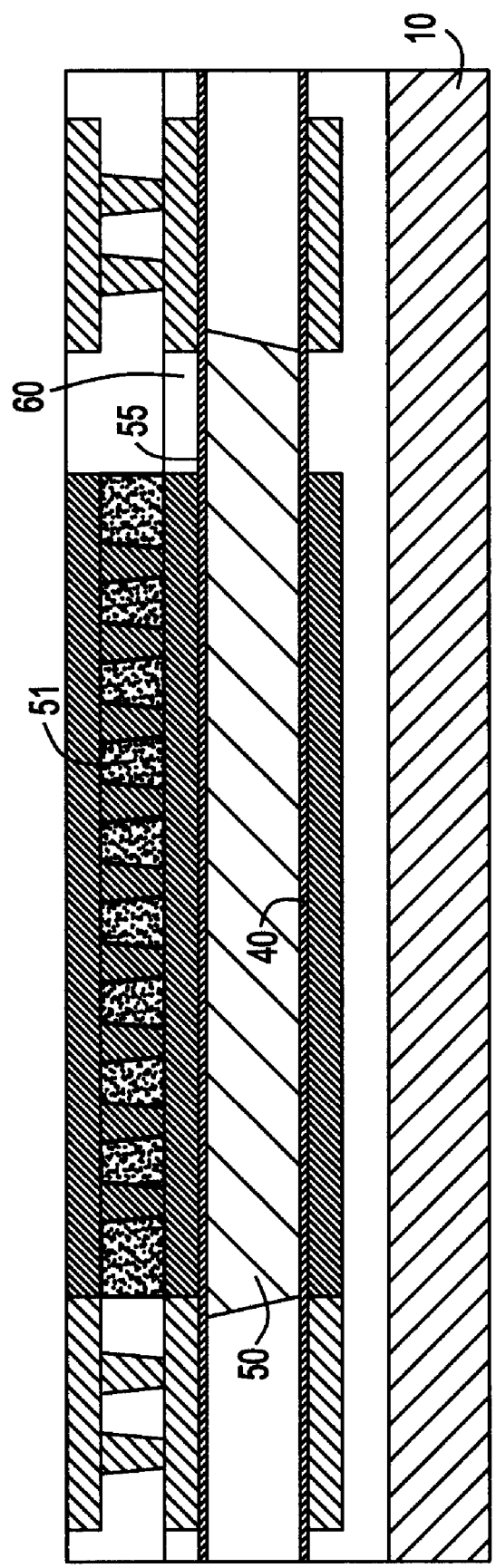

FIG. 13a shows the via interconnects being formed within the interlevel dielectric, but only on top of the connecting pads. In FIG. 13b, the interlevel material above the movable electrode area is etched. In FIGS. 13c and 13d, the elastomeric material 51 is deposited over the gaps, followed by planarization. In FIG. 13e, the elastomeric material is etched and the via interconnects are formed over the movable electrode area, using the damascene process previously referred to. In FIG. 13f, the final step of encapsulation is shown, wherein the next level metal line is formed by a single damascene process.

FIGS. 14a-14c and FIG. 15 show the elastomeric material embedded over the entire substrate. In FIG. 14a, elastomeric material 51 is deposited over the substrate. In FIG. 14b, via interconnects are simultaneously formed on top of the movable electrode and connecting pads. FIGS. 14c and 15 the device is encapsulation, with the next level metal line formed by a single damascene process.

Figure 16:
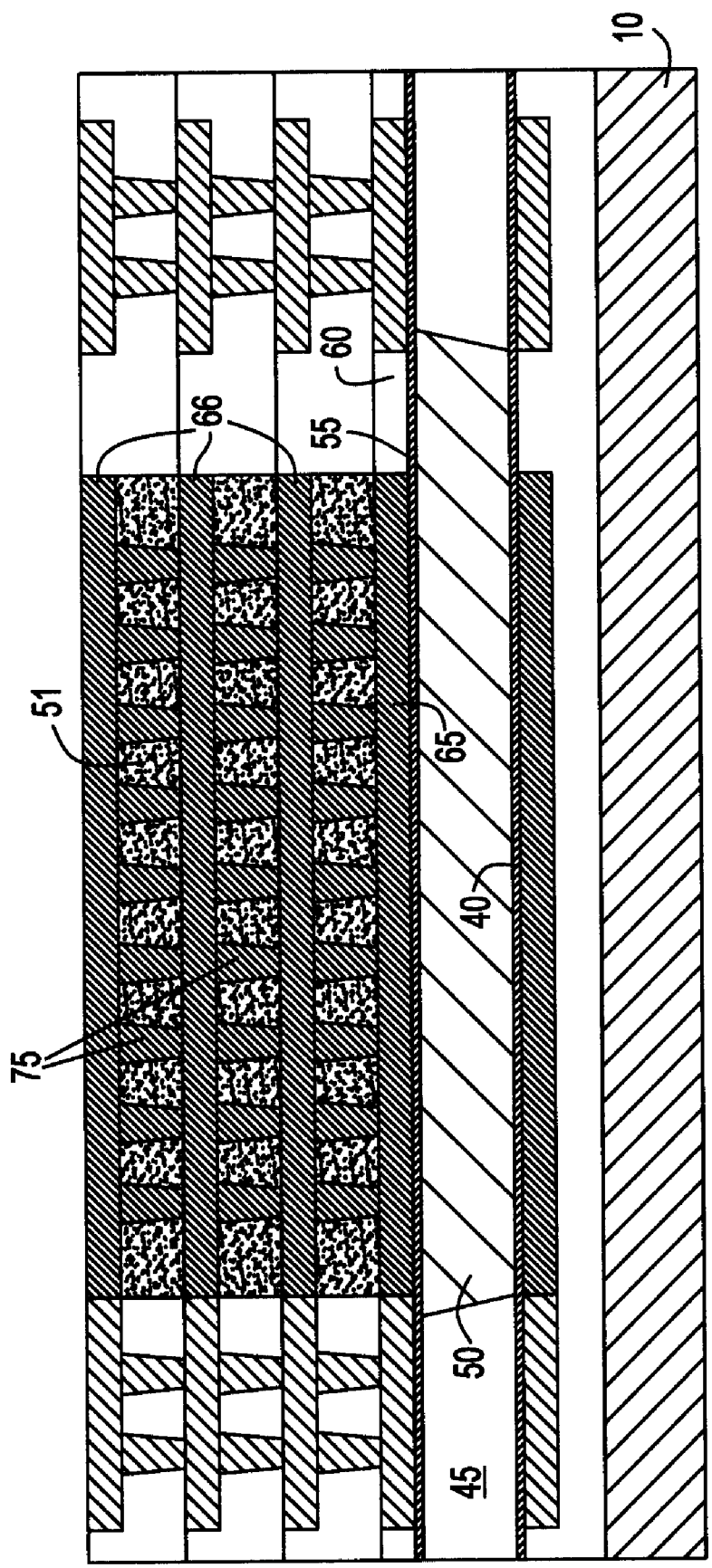
FIG. 16 depicts a cross section of the movable electrode after the fabrication of the multi-layered metal electrodes interconnected by vias within the dielectric.

Referring next to FIG. 16, metal lines 66 and via interconnections 75 are formed within the interlevel dielectric and elastomeric material 51, preferably by a multiple damascene process or by any other embedding process applicable to the elastomeric material. The metal lines are shaped such as they maximize the sidewall area of the interdigitated comb-drive electrodes forming the vertical parallel plate electrodes.

Figure 17:
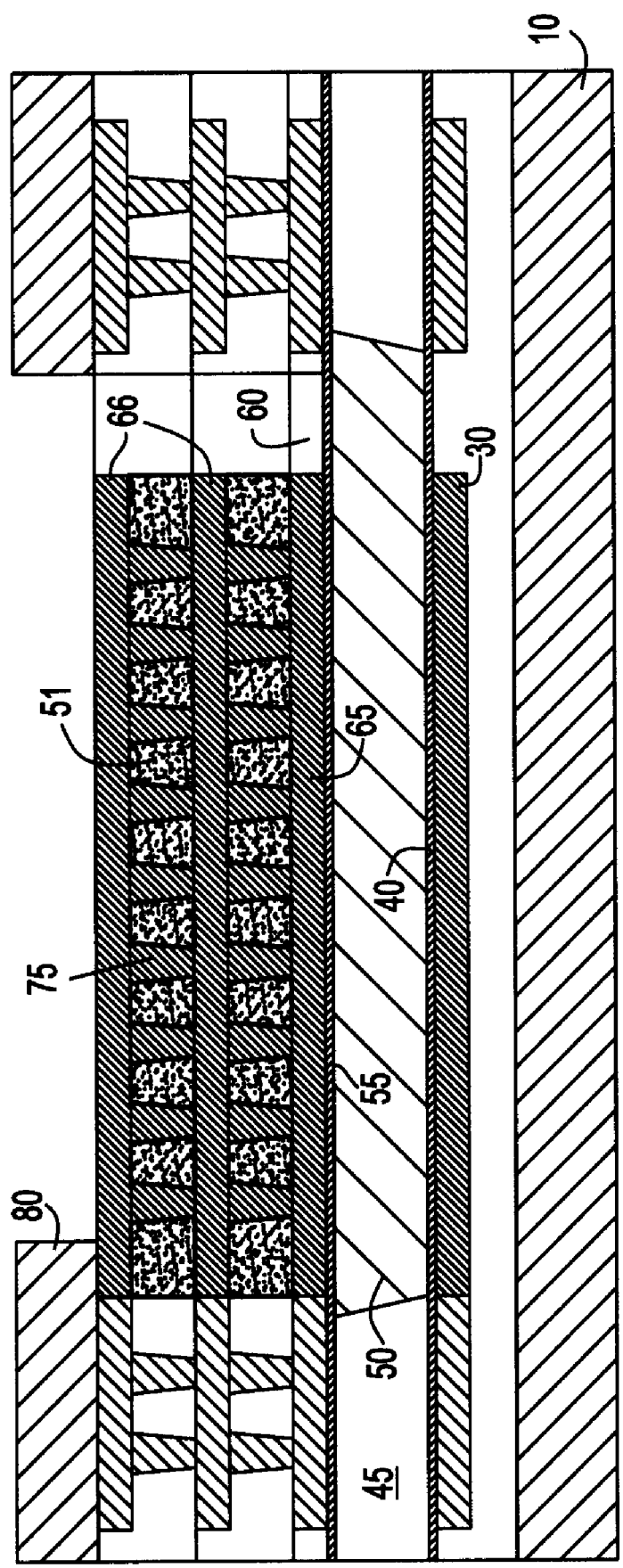
FIGS. 17 and 19 illustrate cross section views of the device wherein the cavity area is patterned by way of standard lithographic techniques and wherein the dielectric between the electrodes is etched.
Figure 18:
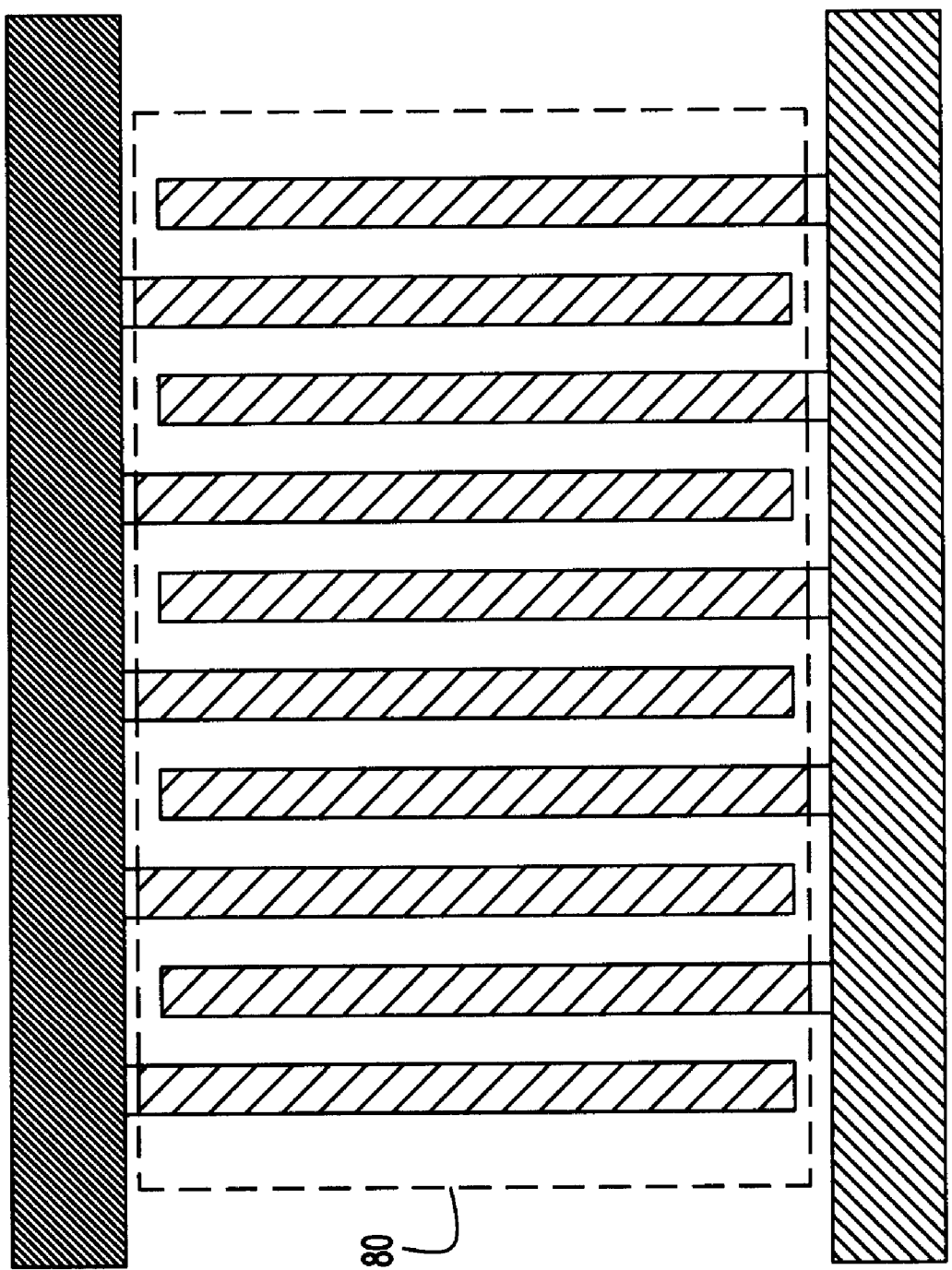
FIG. 18 shows a top-down layout view of a cavity mask used for removing the dielectric and forming the movable electrodes.

Referring next to FIG. 17, there are shown the release mask patterns in the surrounding region around the interdigitated electrodes, using standard lithographic techniques. A top down-view of the release mask area is illustrated in FIG. 18. The boundary defined within region 80 is etched to form the movable electrodes.

Figure 19:
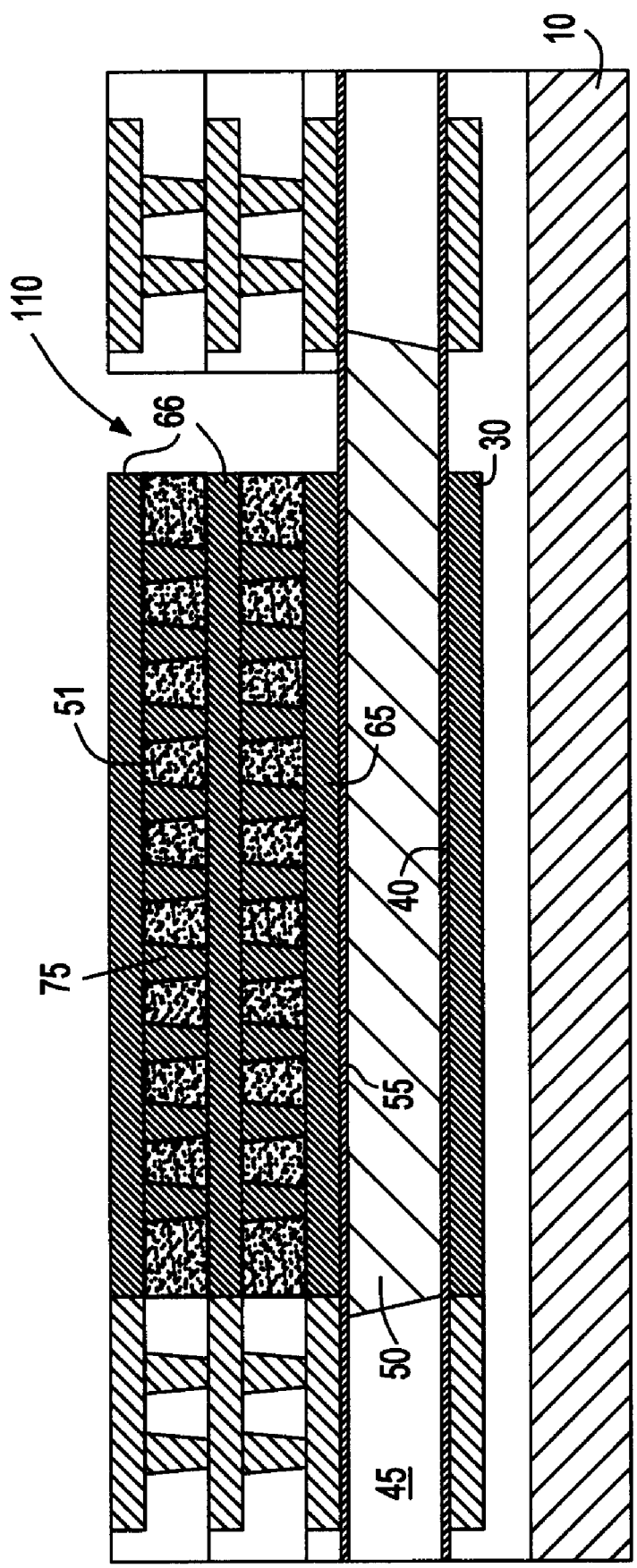

Referring now to FIG. 19, the dielectric and the elastomeric material surrounding the interdigitated electrodes are removed, stopping on dielectric 55. During the dielectric etch process, sidewall spacers are formed along the thickness of the interdigitated electrodes to provide electrical isolation and improve the overall capacitance of the device. The movable electrodes are preferably separated by an air gap between the electrodes. The release mask resist 80 is then removed before further processing. The dielectric layer 55 acts as etch stop before removal of sacrificial material 50.

Figure 20:
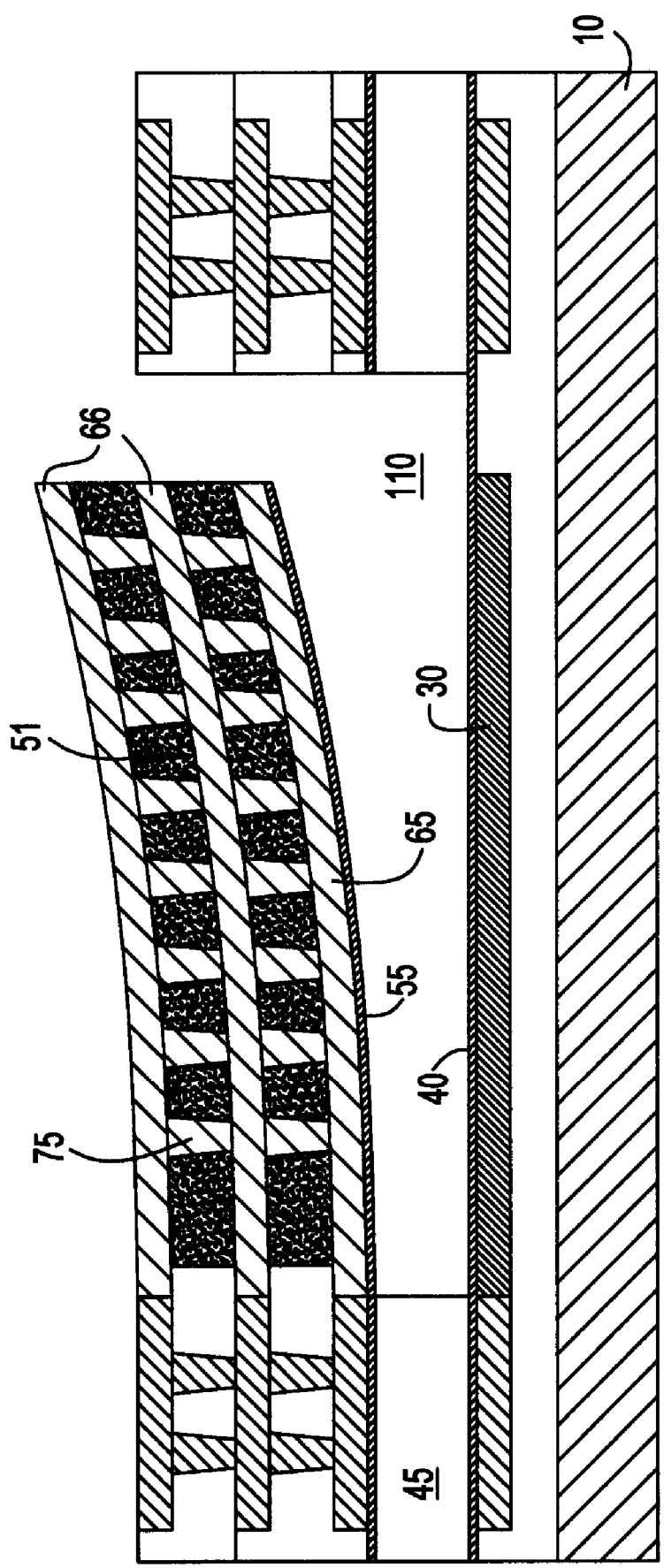
FIG. 20 illustrates a cross section view of the movable electrodes after release, wherein the movable electrode is curled up due to the release of the intrinsic stresses in the electrodes.

Sacrificial material 50 is then etched using an isotropic etch to form an air gap underneath the electrodes, as shown in FIG. 19. The air gap 110 is formed between the first metal layer 30 (actuation electrode) and the second metal layer 65 (ground electrode). At this point, upon completion of the release process, the stress in the copper metal lines 65 and 66, metal via interconnects 75, and the interlevel dielectric having been released, result in a curved shape of the movable electrodes. FIG. 20 shows a cross sectional view of the electrode finger after removal of the sacrificial film. A positive stress gradient is created by the stress in the thin barrier films and in the bulk copper film. The amount of positive stress gradient determines the net deflection of the electrodes. This stress, in turn, is determined by the thickness of the metal structures 65 and 66, the thickness of the liner material, the thickness of ILD films and various conditions affecting the deposition.

Furthermore, the conditions governing the deposition of the barrier films determine the stress gradient over the entire structure. Barrier material is deposited using physical vapor deposition techniques, preferably, TiN, Ta, or TaN. TiN or TaN is deposited by reactive, magnetron sputtering in, preferably, in an Argon, nitrogen atmosphere. Sputtering is sequential with or without an air-break. For TiN, a nitrogen to argon gas mixture is used, ranging between 3:1 and 5:1, and preferably at 4:1, while maintaining the total chamber pressure between 2 and 20 mT. The temperature of deposition oscillates between 40° to 100° C. Under the aforementioned deposition conditions, an X-ray diffraction analysis indicates that the sputtered film is cubic osbornite TiN, irrespective of whether the deposition is on an oxide or TaN. For TaN, the argon to nitrogen ratio ranges from 1.5 to 3 and preferably between 2 and 2.5. The pressure in the chamber preferably ranges from 2 to 20 mT, with the temperature of deposition remaining between 40° to 200° C. XRD (X-ray diffraction) scans indicate that TaN is a combination of the cubic and hexagonal phases when deposited on an oxide. The thickness of the TiN barrier film varies between 20 to 200 Å, preferably, between 40 and 100 Å, while the thickness of the TaN film oscillates between 200 Å and 1000 Å, preferably around 400 Å to 700 Å. The copper plating is performed in selrex or viaform chemistry leading to a low stress copper film. The stress gradient in the film and the net deflection of the electrode are carefully monitored by controlling the film thicknesses and the deposition conditions.

Figure 21:
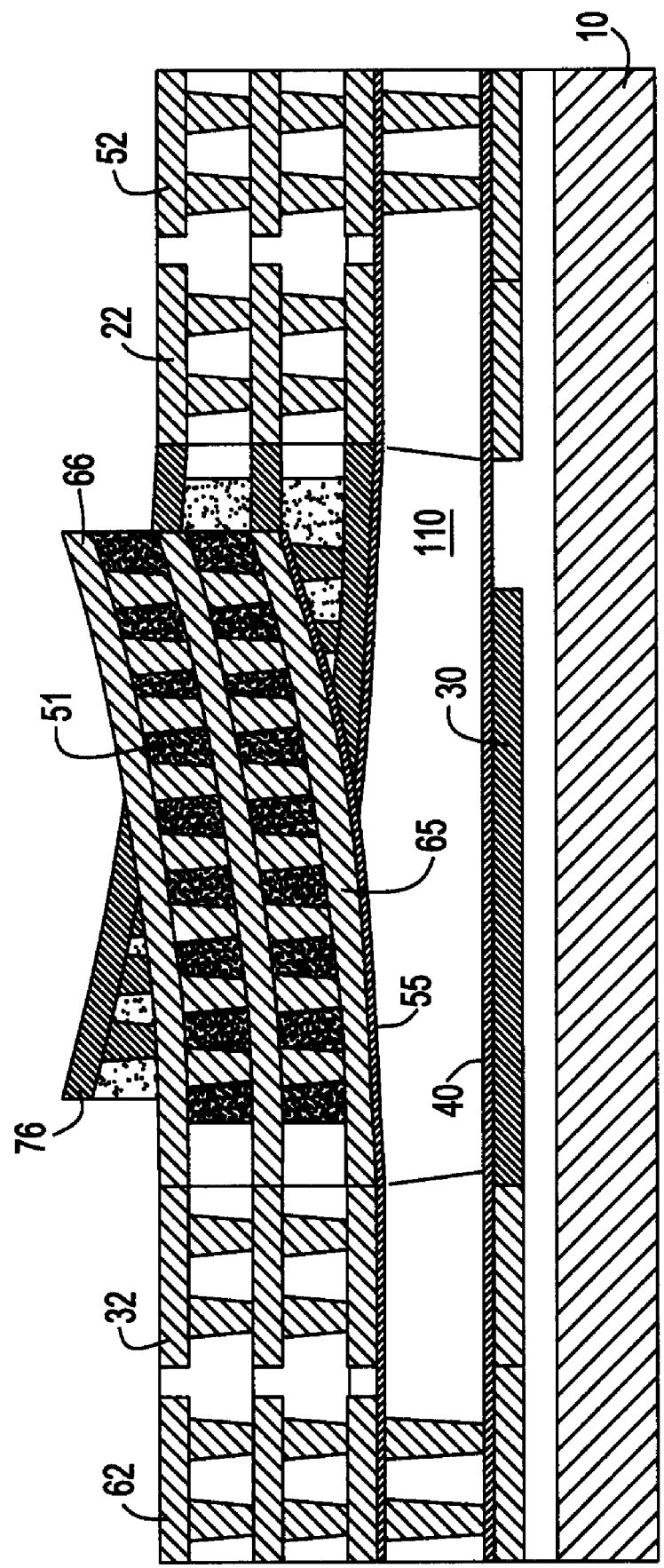
FIG. 21 shows a cross section view of the MEMS capacitor along with the wiring of the actuation electrodes, seen at a cut through the lines AA" shown in FIG. 2.

FIG. 21 shows a cross section view of the completed MEMS variable capacitor device depicting both the movable electrodes 76 and 66, as seen at a cut defined by line A-A" of FIG. 2. Electrode 76 is illustrated in the background, showing the sidewall overlap area between the curled movable electrodes 66 and 76. Any change in the sidewall overlap area resulting from the action of the movable electrodes, leads to a change in capacitance of the device.

While the invention has been described in conjunction with a preferred embodiment, it is to be understood that many alternatives, modifications and variations will be apparent to those skilled in the art in light of the aforementioned description. Accordingly, it is intended to embrace all such alternatives, modifications and variations which fall within the spirit and scope of the appended claims. All matters set forth herein or shown in the accompanying drawings are to be interpreted in an illustrative and nonlimiting sense.

The invention claimed is:

1. A method of fabricating a micro-electromechanical system (MEMS) variable capacitor comprising the steps of:
   a) depositing a first dielectric layer on a substrate, said first dielectric layer having at least one cavity etched therein;
   b) forming an actuation electrode by filling with metal followed by planarizing said at least one cavity;
   c) depositing a second dielectric layer on said first dielectric layer, and etching at least one cavity therein;
   d) filling and planarizing said at least one cavity in said second dielectric layer with sacrificial material;
   e) depositing a third dielectric layer on said second dielectric layer and etching at least one cavity therein;
   f) forming a ground plane electrode by filling with metal and then planarizing said cavity in said third dielectric layer;
   g) forming a plurality metal lines on top of said third dielectric layer, said plurality of metal lines being interconnected therebetween and to the ground plane electrode by way of conductive vias;
   h) embedding elastomeric material between said conductive vias; and
   i) selectively removing portions of said third dielectric layer surrounding said metal lines and said ground plane electrode, and etching away said sacrificial material.

2. The method as recited in claim 1, wherein steps g) and h) further comprise the steps of:
   forming said conductive vias above said ground plane electrode in said third dielectric layer;
   etching away said portions of said third dielectric layer adjacent to said conductive vias;
   depositing said elastomeric material in gaps separating said conductive vias; and
   planarizing said elastomeric material.

3. The method as recited in claim 1, wherein steps g) and h) further comprise the steps of:
   etching a cavity in a fourth dielectric layer deposited on said third dielectric layer;
   depositing said elastomeric material in said etched cavity in said fourth dielectric layer; and
   forming conductive vias within said elastomeric material.

4. The method as recited in claim 1, wherein steps g) and h) further comprise the steps of:
   depositing said elastomeric material on said third dielectric layer;
   depositing a fourth dielectric layer on said elastomeric material;
   etching and forming said conductive vias in said fourth dielectric layer and said elastomeric material;
   etching at least one cavity in said fourth dielectric layer exposing said conductive vias; and
   filling said at least one cavity in said fourth dielectric layer with conductive material followed by
   planarizing said fourth dielectric layer and said conductive material.

5. The method as recited in claim 4 further comprising the step of lining said at least one cavity with barrier material.

6. The method as recited in claim 5, wherein said ground plane electrodes and metal lines bend up or down depending on a stress gradient within said metal lines.

7. The method as recited in claim 6, wherein creating said stress gradient within said metal lines comprises the steps of:
   a) varying deposition conditions of said metal lines;
   b) controlling said deposition conditions and composition of barrier material surrounding said at least one cavity in said fourth dielectric layer;
   c) varying a thickness of said barrier material; and
   d) varying said deposition conditions of said fourth dielectric layer above said sacrificial material and said elastomeric material positioned between said conductive vias.

8. The method as recited in claim 7, wherein said metal lines comprise at least one material selected from a group consisting of TaN, Ta, TiN, W, and copper.

9. The method as recited in claim 1, wherein said removed portions of said third dielectric material surrounding said metal lines and said ground plane electrode following said etching away of said sacrificial material are separated from each other by air.

10. The method as recited in claim 1, wherein a voltage applied between said actuation electrodes and said ground plane electrode creates an attraction force on said ground plane electrode and said metal lines, inducing movement of said ground plane electrode with respect to said actuation electrode.

11. The method as recited in claim 1, wherein said conductive vias are separated from each other by said elastomeric material.

12. The method as recited in claim 1, wherein said ground plane electrodes and said metal lines are anchored in dielectric material on at least one end thereof.

13. The method as recited in claim 1, wherein step d) further comprises the steps of:

d1) depositing an insulating layer above said planarized sacrificial material; and d2) depositing an insulating layer above said actuation electrodes.

14. The method as recited in claim 13, wherein said insulating layers are made of a dielectric material selected from a group consisting of SiN, $SiO_2$ and SiCN.

15. The method as recited in claim 13, wherein said second dielectric layer is selected from a group consisting of $SiO_2$, flourinated $SiO_2$, and SiCOH.

* * * * *